(12) United States Patent
Itoi et al.

(10) Patent No.: US 9,225,523 B2
(45) Date of Patent: Dec. 29, 2015

(54) AUTHENTICATION SYSTEM AND AUTHENTICATION METHOD

(75) Inventors: Masayuki Itoi, Ichikawa (JP); Mitsumasa Date, Toda (JP)

(73) Assignee: Safety Angle Inc., Ichikawa (JP)

( * ) Notice: Subject to any disclaimer, the term of this patent is extended or adjusted under 35 U.S.C. 154(b) by 777 days.

(21) Appl. No.: 13/615,558

(22) Filed: Sep. 13, 2012

(65) Prior Publication Data

US 2013/0018797 A1   Jan. 17, 2013

Related U.S. Application Data

(63) Continuation of application No. 12/425,839, filed on Apr. 17, 2009, now Pat. No. 8,290,875.

(30) Foreign Application Priority Data

Jul. 16, 2008   (JP) .................................. 2008-184466

(51) Int. Cl.

| | |
|---|---|
| *G06Q 20/00* | (2012.01) |
| *H04L 9/08* | (2006.01) |
| *G06Q 20/02* | (2012.01) |
| *G06Q 20/24* | (2012.01) |
| *G06Q 20/38* | (2012.01) |
| *G06Q 20/40* | (2012.01) |
| *G06Q 20/42* | (2012.01) |
| *G06Q 30/06* | (2012.01) |
| *H04L 9/32* | (2006.01) |
| *G06Q 20/32* | (2012.01) |

(52) U.S. Cl.

CPC .............. *H04L 9/0897* (2013.01); *G06Q 20/02* (2013.01); *G06Q 20/24* (2013.01); *G06Q 20/325* (2013.01); *G06Q 20/385* (2013.01); *G06Q 20/3829* (2013.01); *G06Q 20/40* (2013.01); *G06Q 20/425* (2013.01); *G06Q 30/0601* (2013.01); *H04L 9/321* (2013.01); *H04L 9/3226* (2013.01)

(58) Field of Classification Search

USPC ........................................................... 705/64

See application file for complete search history.

(56) References Cited

U.S. PATENT DOCUMENTS

| | | | | |
|---|---|---|---|---|
| 6,598,031 B1* | 7/2003 | Ice | .......................... | G06Q 20/04 |
| | | | | 705/50 |
| 7,500,602 B2* | 3/2009 | Gray | ....................... | G06Q 20/10 |
| | | | | 235/375 |
| 7,571,142 B1* | 8/2009 | Flitcroft | .................. | G06Q 20/00 |
| | | | | 705/35 |
| 7,593,896 B1* | 9/2009 | Flitcroft | .................. | G06Q 20/00 |
| | | | | 705/35 |
| 2006/0085357 A1* | 4/2006 | Pizarro | ................... | G06Q 20/10 |
| | | | | 705/64 |

* cited by examiner

*Primary Examiner* — Jamie Kucab

(74) *Attorney, Agent, or Firm* — Lerner, David, Littenberg, Krumholz & Mentlik, LLP

(57) ABSTRACT

In order to prevent leakage of an authentication symbol string such as a credit card number, and enable a user to be authenticated: an ID issuance server 20 receives the first eight digits of the credit card number from a portable telephone device 10 of the user and issues a one-time ID to the portable telephone device 10; and a service provision server 30 receives the last eight digits of the credit card number and the one-time ID from a PC 11, and transmits the one-time ID and those last eight digits to a number construction and authentication processing server 40 that receives the one-time ID and the last eight digits from the service provision server 30, communicates with the ID issuance server 20 and acquires the first eight digits which correspond to the one-time ID, reconstructs the credit card number, and performs authentication.

17 Claims, 12 Drawing Sheets

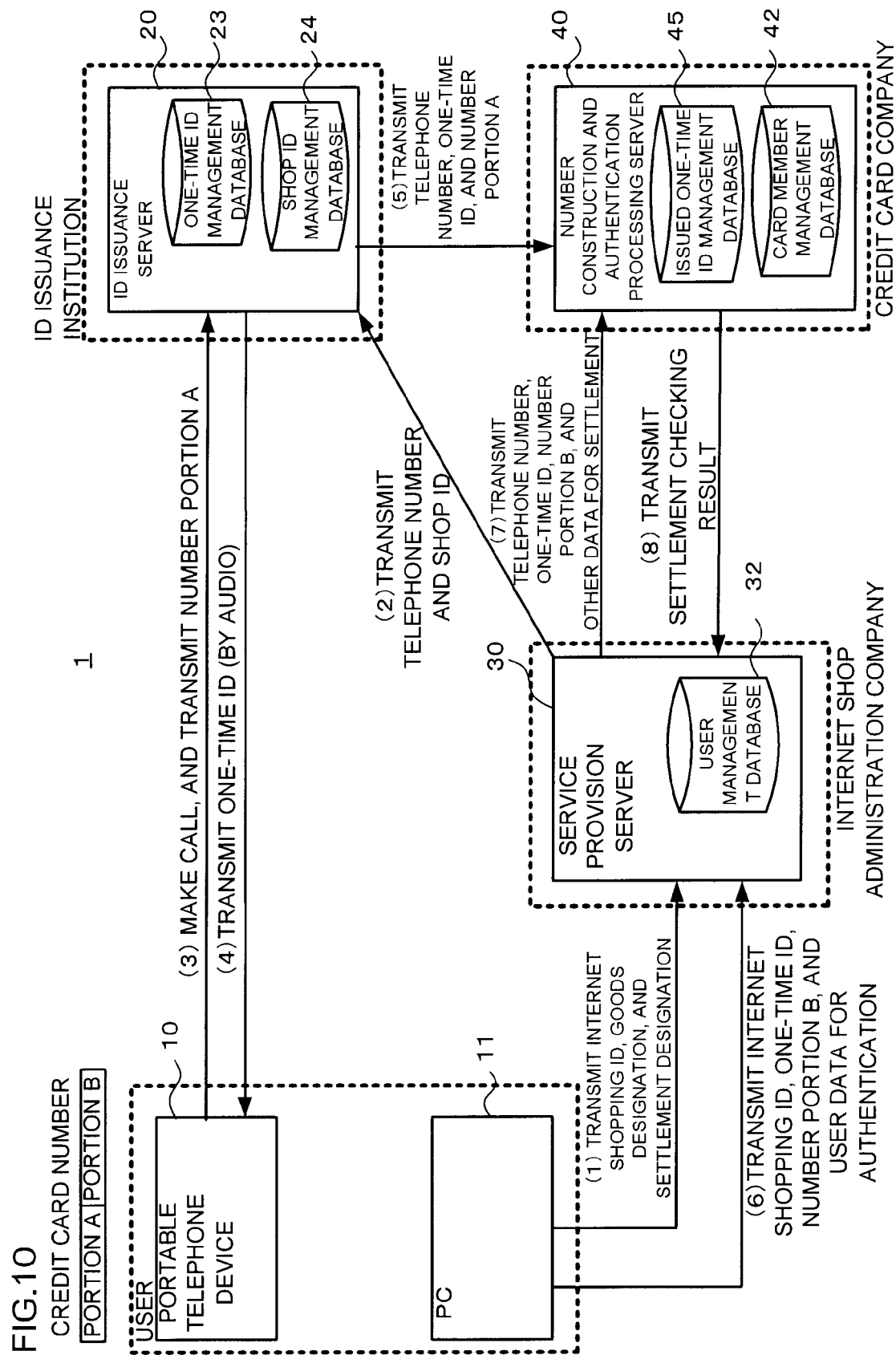

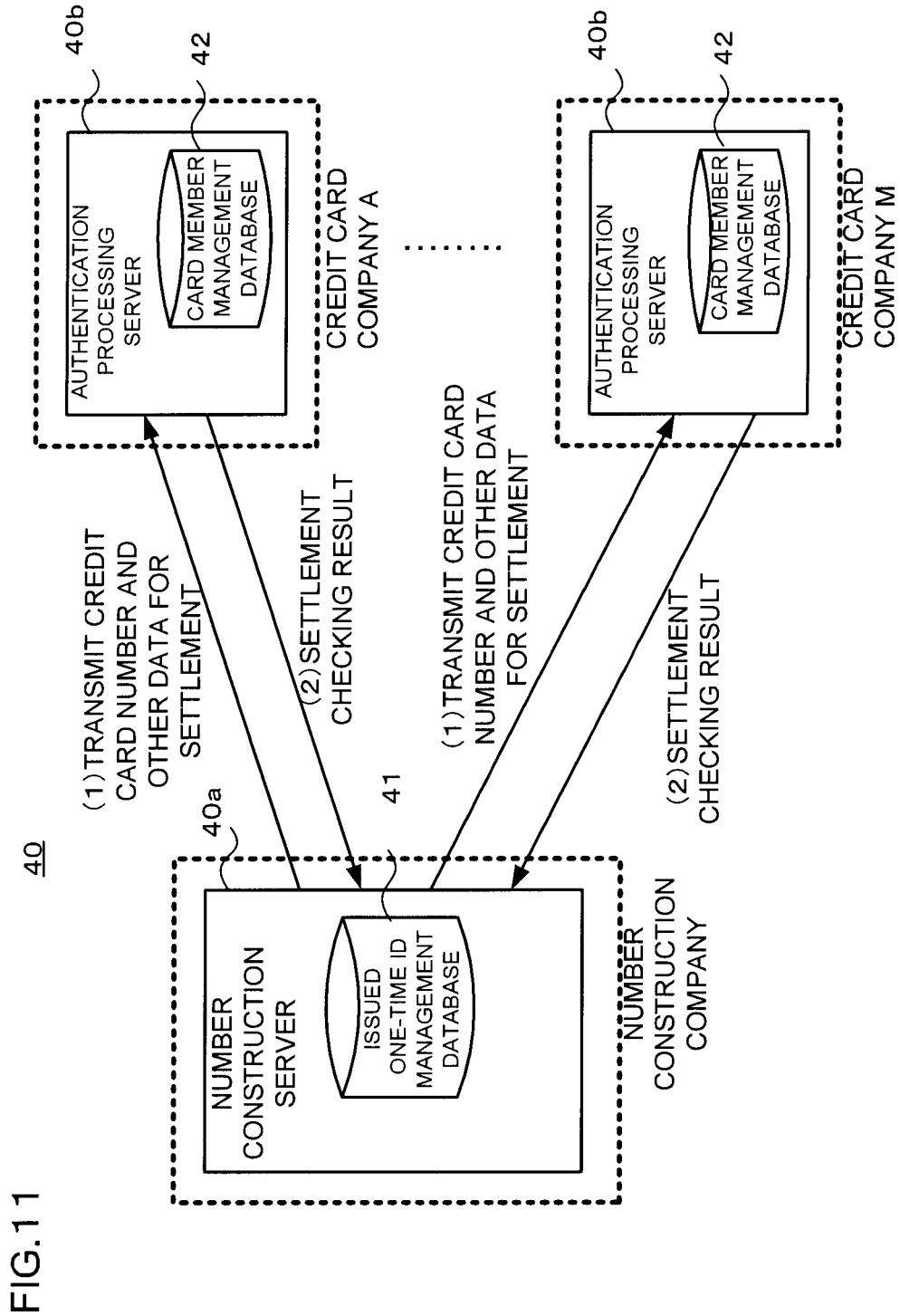

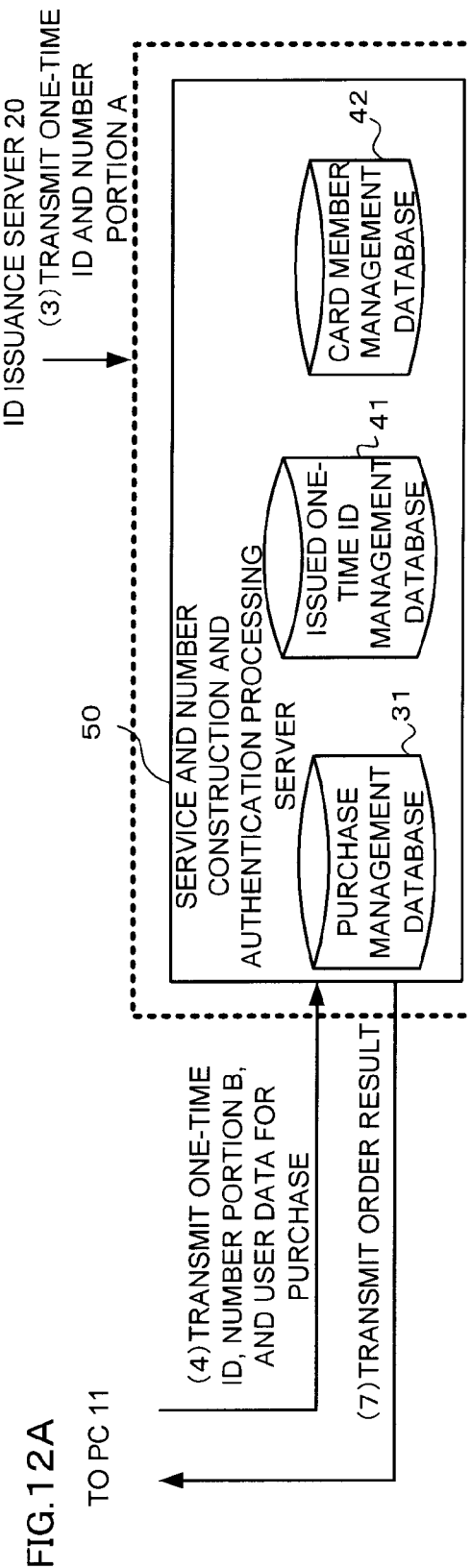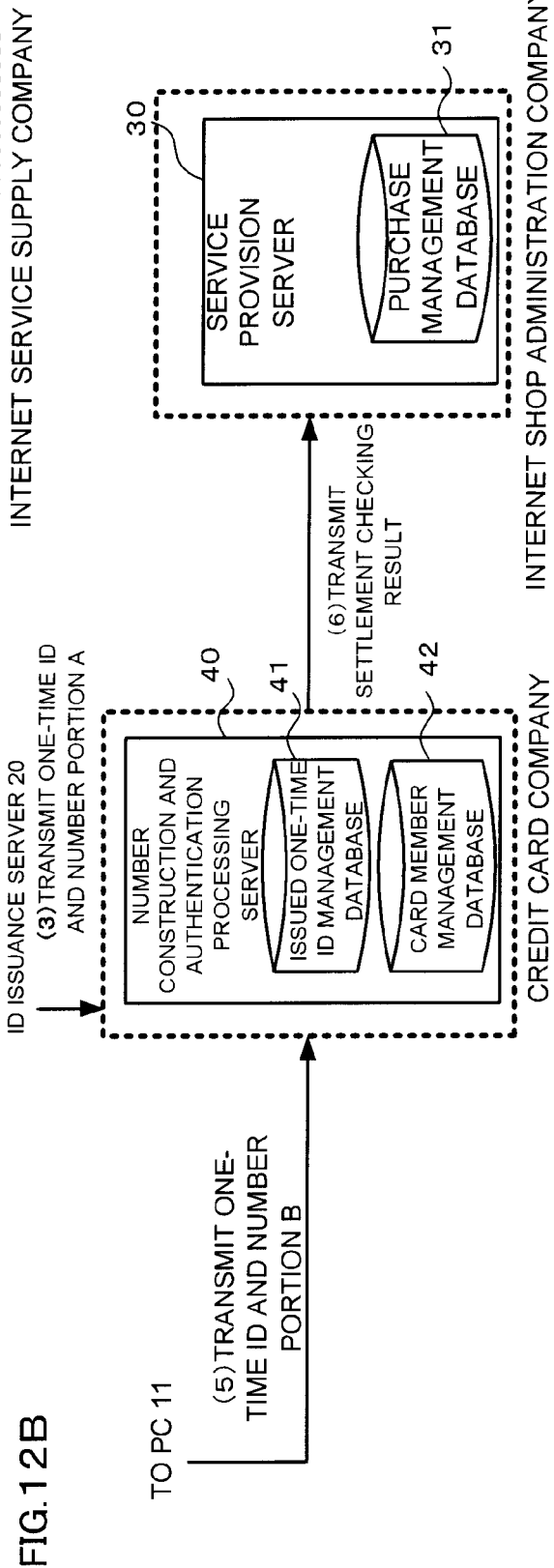
FIG. 12A
FIG. 12B

AUTHENTICATION SYSTEM AND AUTHENTICATION METHOD

CROSS-REFERENCE TO RELATED APPLICATIONS

The present application is a continuation of and claims priority pursuant to 35 U.S.C. §120 to U.S. patent application No. 12/425839, filed on Apr. 17, 2009, which in turn claims priority pursuant to 35 U.S.C. §119 to Japanese patent application no. 2008-184466, filed on Jul. 16, 2008, the entire disclosures of which are hereby incorporated by reference herein.

STATEMENT REGARDING FEDERALLY SPONSORED RESEARCH OR DEVELOPMENT

Not Applicable

BACKGROUND OF THE INVENTION

1. Field of the Invention

The present invention relates to an authentication system and an authentication method for authenticating that a user is the proper person by using an authentication symbol string such as a credit card number or the like, when he is performing, for example, payment by credit card or logging on to a server or the like.

2. Description of the Related Art

When a user has performed payment by credit card at a internet shop over the internet, it has been necessary for the user to input via a PC (personal computer) information such as his own credit card number, the period of validity of the credit card (which is used for authentication), the name of the cardholder, and so on.

Due to this, this information such as the credit card number of the user, the period of validity of the card, the name of the cardholder and so on comes to be transmitted to the server of the internet shop via the internet, so that there has beers a problem of leakage of this information from the internet or from the server of the internet shop.

By contrast, in the Published Japanese Translation No. 2005-521181 of the PCT International Publication (Patent Reference #1), there is also a per se known technique of inputting a portion of the credit card number and attribute information such as the name of the user, his date of birth, or the like, and of performing authentication on the basis of this information.

Furthermore, in the Published Japanese Translation No. 2002-522775 of the PCT International Publication (Patent Reference #2), there is a per se known technique of separating the information into first data and second data, and of ensuring that all of the information is not stored upon any single device, by storing the first data upon a client system while storing the second data upon a remote server.

Moreover, in the Japanese Laid-Open Patent Publication 2003-13229 (Patent Reference #3), a per se known technique has been disclosed of preventing the leakage of information over a communication path by separating electronic information, which is a product, into several portions, and by transmitting the portions via different paths at different times.

Yet further, in the Japanese Laid-Open Patent Publication 2007-41957 (Patent Reference #4), there is a per se known technique of separating credit card information into two portions, and of storing one portion of this separated information upon a user terminal while storing the other portion thereof in an information device of an storage center, so that; during payment, the settlement center acquires the separated information portion which is stored in the user terminal and the separated information portion which is stored in the storage center information device, and restores the credit card by combining these two portions, so as to be able to perform credit approval and settlement processing.

With, for example, the technique of Patent Reference #1, although there is no leakage of the entire credit card number, since the authentication is not performed using the entire credit card number, there is a possibility that the authentication will not be sufficient. Moreover there is also the problem that, if the user of the PC is infected with a virus, then there is also a possibility that information which has been inputted via the keyboard may undesirably be transmitted to the exterior by the virus and thereby suffer leakage, and, in this case, a portion of the credit card number which has been inputted and other information which may be used for authentication may leak out, so that improper authentication may subsequently be performed using that information. Moreover, according to the technique of Patent Reference #2, although each of the devices individually cannot leak out all of the information, there is still the problem that, if the client system is used by a third party whose intent is nefarious, then he may obtain authentication in a similar manner to the legitimate user, which is undesirable.

Furthermore, with the technique of Patent Reference #3, while this is able to prevent leakage upon the communication path, since the electronic information itself is present within the device upon the transmission side, it is not possible to prevent it undesirably leaking out from this device upon the transmission side. Moreover, with the technique of Patent Reference #4, although there can be no leakage of the entire credit card information, from either the user terminal or the storage center information device, it is necessary to store a separated portion of the credit card information upon the storage center information device, so that the user is not able to be completely confident, since the storage center is not an absolutely trustworthy institution. Moreover, if the user terminal is used by an ill-intentioned third party, then there is the problem that he may be authenticated in a similar manner to a legitimate user.

The present invention has been conceived in consideration of the problems described above, and its object is to provide a technique which can appropriately prevent leakage of an authentication symbol string such as, for example, a credit card number, while also appropriately authenticating a user who is the right person.

BRIEF SUMMARY OF THE INTENTION

In order to attain the object described above, the authentication system according to one aspect of the present invention includes an authentication server which performs authentication using an authentication symbol string, a one-time ID issuance server, and an authentication symbol string construction server, wherein: the one-time ID issuance server includes: a first reception unit which receives, from a first terminal of a user, a first symbol string which is a portion of the authentication-symbol string; an ID issuance unit which issues a one-time ID to the first terminal; and a one-time ID storage unit which stores the first symbol string and the one-time ID which has been issued in mutual correspondence; and the authentication symbol string construction server includes: a second reception unit which receives, from a second terminal, a second symbol string which is the remaining portion of the authentication symbol string other than the first symbol string, and the one-time ID, a first symbol string acquisition unit which acquires the first symbol string which corresponds to the one-time ID by communication with the one-time ID issuance server; a construction unit which reconstructs the authentication symbol string on the basis of the first symbol string which has been acquired and the second symbol string which has been received; and an authentication symbol string transmission unit which transmits the authentication symbol string which has been reconstructed to the authentication server.

Here, the one-time ID is an ID which can be used temporarily and/or only once. Moreover, the authentication symbol string is a symbol string which is composed of numerals, letters, symbols, or a combination of two or more of these types of characters, and may be something that is used for authentication in some other manner as well, such as, for example, a credit card number, or a number which is used for services on the network of a financial institution such as a bank or a securities company or the like (for example, an account number or a member number or the like), or a log-in password to a network service, or a user number which is issued by a public institution, or a telephone number, an address, a name, a pass word, or a combination of these. Moreover, reception from the second terminal of the second symbol string which is the remaining portion of the authentication symbol string other than the first symbol string, and of the one-time ID, both includes direct reception from the second terminal, and also includes reception indirectly via some other device or group of devices.

According to this authentication system, by the first symbol string and the second symbol string of the authentication symbol siring being inputted from different terminals, it is ensured that ail of the authentication symbol string cannot leak, out from either of these terminals individually. Moreover, although the first symbol string is transmitted to the ID issuance server, since the second symbol string is not transmitted, accordingly all of the authentication symbol string cannot leak during this transmission. Yet further, it is possible to reconstruct the authentication symbol string from the first symbol string and the second symbol string which are inputted from different terminals, on the basis of the one-time ID, so that this may be used for authentication in an appropriate manner.

And, with the authentication system described above, the one-time ID issuance server may further include a first authentication key storage unit which stores a first authentication key of the user, and a management ID of the user; and: the first reception unit may acquire the first authentication key and the first symbol string from the first terminal of the user; the one-time ID issuance server may further include a first authentication key authentication unit which performs a first stage of authentication by comparing the first authentication key which has been received, with the first authentication key which is stored in the authentication key storage unit; the ID issuance unit may issue the one-time ID if the authentication has succeeded, the one-time ID storage unit may store the one-time ID, the first symbol string, and the management ID of the user for which authentication has succeeded, in mutual correspondence; the second reception unit of the authentication symbol string construction server may receive, from the second terminal, a second authentication key of the user, said second symbol string, and the one-time ID; said authentication symbol string construction server may further include: a second authentication key storage unit which stores the second authentication key of the user and the management ID of the user; and a management ID acquisition unit which acquires the management ID which corresponds to the second authentication key which has been received from the second authentication key storage unit; and the first symbol string acquisition unit may acquire the first symbol string on the basis of the management ID which it has acquired and the one-time ID which it has received.

According to this authentication system, it is possible to enhance the accuracy of user authentication, since the first stage of authentication is performed by the one-time ID Issuance server, and moreover a second stage of authentication is also provided by the authentication symbol string construction server acquiring the first, symbol string using the second authentication key.

Furthermore, the authentication system described above may further include a service provision server, and: the authentication server may include a return unit which performs predetermined confirmation processing including authentication on the basis of the authentication symbol string which has been received from the authentication symbol string construction server, and returns a confirmation result; and the service provision server may include a service supply unit which receives the confirmation result, and starts the supply of the service if the confirmation result shows that the supply of the service is permitted. According to this authentication system, it is possible to start the supply of the service according to the predetermined confirmation result which includes the authentication.

Furthermore, with the authentication system described above, the first terminal may be a telephone device, and the first authentication key may be a telephone number of the telephone device, which is notified when a call is made from the telephone device. According to this authentication system, along with it not being necessary for the user to input the first authentication key, it is also possible to enhance the accuracy of the authentication, since, for the authentication to succeed, the first terminal is limited to being one specific telephone device.

Furthermore, the authentication system described above may further include a service provision server, and: the service provision server may include: a first, telephone number reception unit which receives the telephone number of the telephone device of the user; and a telephone number transmission unit which transmits the telephone number which has been received to the one-time ID issuance server; and the one-time ID issuance server may include: a second telephone number reception unit which receives the telephone number from the service provision server, and a telephone number registration unit which registers the telephone number which has been received in the first authentication key storage unit. Since, according to this authentication system, it is possible to divert the data which is registered upon the service provision server to this purpose, accordingly no further load is imposed upon the user, since the telephone number of the telephone device of the user is registered upon the one-time ID issuance server. Due to this, it is possible for the user to utilize this authentication system in a simple and easy manner.

Furthermore, with the authentication system described above, the ID issuance unit may notify the one-time ID by audio. According to this authentication system, it is possible tor the user to use any telephone device which can be employed for audio communication for authentication by this authentication system.

Furthermore, with the authentication system described above, the first symbol string acquisition unit of the authentication symbol string construction server may include: an issued one-time ID reception unit which sequentially receives the one-time IDs issued by the one-time ID issuance server, and the corresponding the first symbol strings; an issued one-time ID storage unit which stores the one-time ID and the first symbol string which have been received; and a first symbol string search unit which searches, from the issued one-time ID storage unit, for a first symbol string corresponding to the one-time ID which has been received from the second terminal. According to this authentication system, it is possible for the processing to produce a response rapidly, since it is possible to search for the first symbol string within the authentication symbol string construction server at the time point that the one-time ID is received from the service provision server.

Furthermore, with the authentication system described above, the first symbol string acquisition unit of the authentication symbol string construction server may include: a one-time ID transmission unit which transmits the one-time ID which has been received to the one-time ID issuance server; and a corresponding first symbol string reception unit which receives from the one-time ID issuance server a first symbol string which corresponds to the one-time ID; and the one-time ID issuance server may include: an issued one-time ID storage unit which stores the one-time IDs which have been issued and the first symbol strings which correspond thereto; a one-time ID reception unit which receives the one-time ID which has been transmitted from the authentication symbol string construction server; a first symbol string search unit which searches, on the basis of the issued one-time ID storage unit, for a first symbol string corresponding to the one-time ID which has been received from the authentication symbol string construction server; and a first symbol string transmission unit which transmits the first symbol string which has been found to the authentication symbol string construction server.

According to this authentication system, it is possible to reduce the memory amount which is necessary for the authentication symbol string construction server, since it is not necessary to store ail of the one-time IDs and the first symbol strings which have been issued by the ID issuance server upon the authentication symbol string construction server.

And an authentication method according to another aspect of the present invention is for an authentication system which includes an authentication server which performs authentication using an authentication symbol string, a one-time ID issuance server, and an authentication symbol string construction server, and includes: a first reception step in which the one-time ID issuance server receives, from a first terminal of a user, a first symbol string which is a portion of the authentication symbol string; a one-time ID issuance step in which the ID issuance unit issuing a one-time ID to the first terminal; a one-time ID storage step in which the one-time ID issuance server stores the first symbol string and the one-time ID which has been issued in mutual correspondence in a one-time ID storage unit; a second reception step in which the authentication symbol string construction server receives, from a second terminal, a second symbol string which is the remaining portion of the authentication symbol string other than the first symbol string, and the one-time ID, a first symbol string acquisition step in which the authentication symbol string construction server acquires the first symbol string which corresponds to the one-time ID which has been received; a construction step in which the authentication symbol string construction server reconstructs the authentication symbol string on the basis of the first symbol string which has been acquired and the second symbol string which has been received from the second terminal; an authentication symbol string transmission step in which the authentication symbol string construction server transmits the authentication symbol string which has been reconstructed to the authentication server; an authentication step in which the authentication server performs confirmation processing which includes authentication on the basis of the authentication symbol string; and a confirmation result transmission step in which the authentication server transmitting the result of the confirmation processing.

According to this authentication method, by the first symbol string and the second symbol string of the authentication symbol string being inputted from different terminals, it is ensured that all of the authentication symbol string cannot leak out from either of these terminals individually. Moreover, although the first symbol string is transmitted to the ID issuance server, since the second symbol string is not transmitted, accordingly all of the authentication symbol string cannot leak during this transmission. Yet further, it is possible to reconstruct the authentication symbol string from the first symbol string and the second symbol string which are inputted from different terminals, on the basis of the one-time ID, so that this may be used for authentication in an appropriate manner.

Furthermore, with the authentication method described above, the one-time ID issuance server may include a first authentication key storage unit which stores a first authentication key of the user, and a management ID of the user; the authentication symbol string construction server may include a second authentication key storage means which stores a second authentication key of the user, and the management ID of the user; in the first reception step, the first authentication key and the first symbol string may be acquired from the first terminal of the user; in the one-time ID issuance step, a first stage of authentication may be performed by comparing the first authentication key which has been received, with the first authentication key which is stored in the authentication key storage unit, and the one-time ID is issued if this authentication has succeeded; in the one-time ID storage step, the one-time ID, the first symbol string, and the management ID of the user for which authentication has succeeded, may be stored in mutual correspondence; in the second reception step, the second authentication key and the second authentication symbol string may be received from the second terminal; in the second symbol string transmission step, the second authentication key and the second authentication symbol string may be transmitted to the authentication symbol string construction server; and there may be further included a management ID acquisition step in which the authentication symbol string construction server acquires from the second authentication key storage unit the management ID which corresponds to the second authentication key which was received in the third reception step, and, in said first symbol string acquisition step, the first symbol string may be acquired on the basis of the management ID which has been acquired and the one-time ID which has been received.

According to this authentication method, it is possible to enhance the accuracy of user authentication, since the first stage of authentication is performed by the one-time ID issuance server, and moreover a second stage of authentication is also provided by the authentication symbol string construction server acquiring the first symbol string using the second authentication key.

Furthermore, with the authentication method described above, the first terminal may be a telephone device, and the first authentication key may be a telephone number of the telephone device, and there may be further included: a first telephone number reception step in which a service provision server of the authentication system receives the telephone number of the telephone device of the user; a telephone number transmission step in which said telephone number which has been received, is transmitted to the one-time ID issuance server; a second telephone number reception step in which the one-time ID issuance server receives the telephone number from the service provision server; and a telephone number registration step in which the telephone number which has been received, is registered in the first authentication key storage unit.

Since, according to this authentication method, it is possible to divert the data which is registered upon the service provision server to this purpose, accordingly no further load is imposed upon the user, since the telephone number of the telephone device of the user is registered upon the one-time ID issuance server. Due to this, it is possible for the user to utilize this authentication system in a simple and easy manner.

BRIEF DESCRIPTION OF THE SEVERAL VIEWS OF THE DRAWINGS

FIG. 10 is a figure for explanation of the schematic structure and processing of an authentication system according to a third configuration;

FIG. 11 is a structural diagram of a number construction and authentication processing server according to a variant configuration; and FIG. 12 is a structural diagram of a portion of an authentication system according to another variant configuration.

DETAILED DESCRIPTION OF THE INVENTION

Configurations will now be explained with reference to the drawings. It should be understood that the configurations explained below are not to be considered as being limitative of the scope of the Claims in any way; and, moreover, it is not the case that all of the elements and the combinations thereof which are explained in connection with these configurations are essential as means for implementation of the authentication system and method.

First, an authentication system according to a first configuration will be explained.

Figure 1:
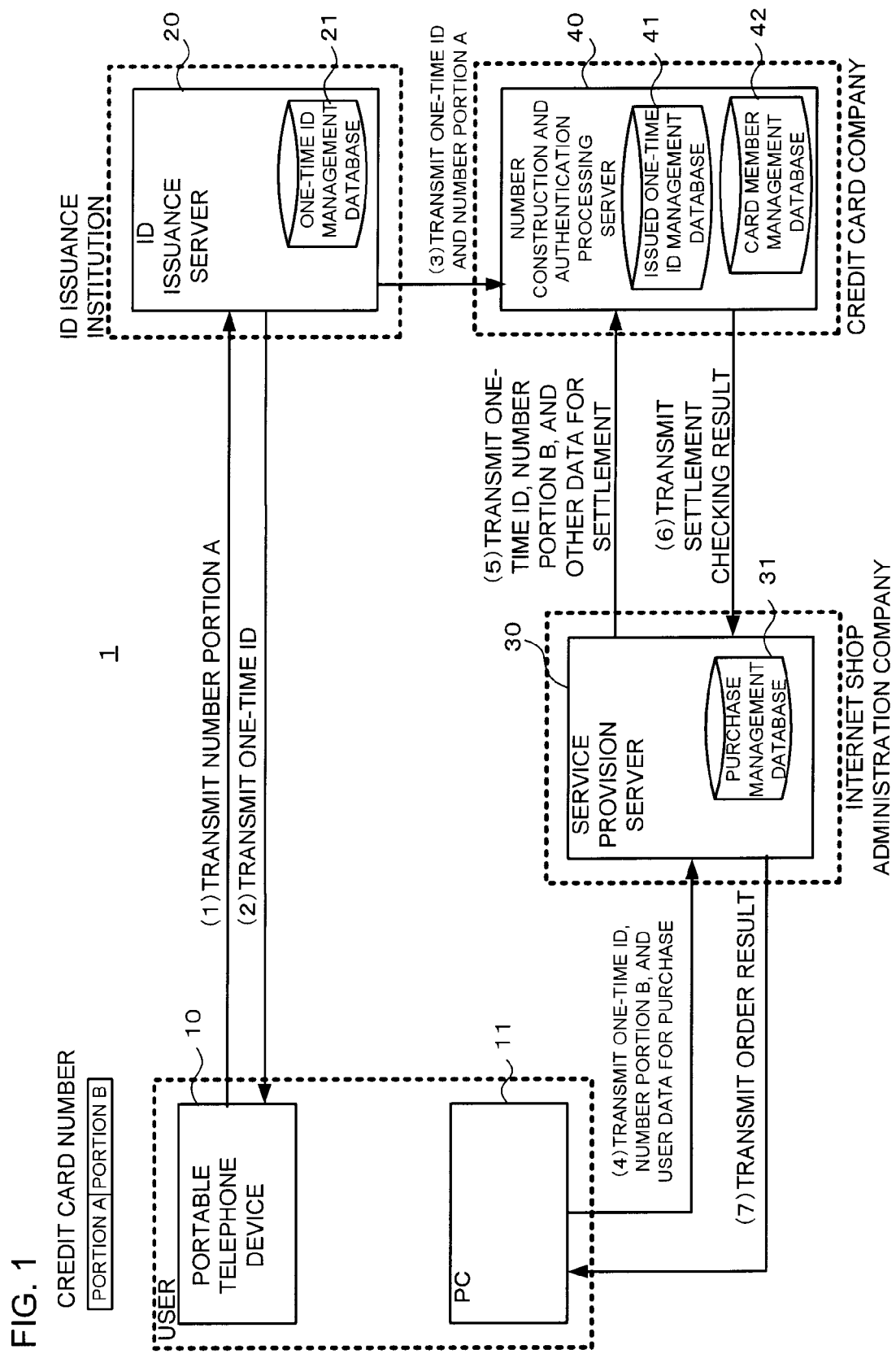
FIG. 1 is a figure for explanation of the schematic structure and processing of an authentication system according to a first configuration.

FIG. 1 is a figure for explanation of the schematic structure and processing of an authentication system according to this first configuration.

The authentication system 1 is a system which performs authentication by using a credit card number (which is one example of an authentication symbol string), and comprises a portable telephone device 10 (which is one example of a first terminal), a PC (Personal Computer) 11 (which is one example of a second terminal), an ID issuance server 20 (which is one example of a one-time ID issuance server), a service provision server 30, and a number construction and authentication processing server 40 (which is one example of an authentication symbol string construction server and an authentication server). The portable telephone device 10, the PC 11, the ID issuance server 20, the service provision server 30, and the number construction and authentication processing server 40 each comprises a CPU (Central Processing Unit), a ROM (Read Only Memory), a RAM (Random Access Memory) and so on, none of which are shown in the figures; and, by programs which are stored in the ROMs or the like being executed by the CPUs, it is possible for the various functions of these devices described hereinafter to be implemented.

For example, the portable telephone device 10 and the PC 11 are devices owned by the user. The portable telephone device 10, along with being capable of audio communication with some other telephone device (or with a server which is endowed with the function of a telephone), and of transmitting and receiving data to and from a web server, also is adapted to be able to transmit and receive electronic mail via a network.

The PC 11 stores software for a web browser and electronic mail, and is adapted to transmit and receive data via the network to and from servers of various types, as well as to be able to transfer and receive electronic mail via the internet.

The ID issuance server 20 is managed, for example, by an ID issuance institution which has received permission from a credit card company. The ID issuance server 20 includes a one-time ID management database 21, and performs issue processing of a one-time ID to the portable telephone device 10 and so on.

In this configuration, the one-time ID management database 21 stores numbers (first symbol strings) each of which consists of a portion A (for example, the first eight digits) of a credit card number, and one-time IDs which have been issued to those numbers, in mutual correspondence. Here, this one-time ID is an ID which can be used temporarily and/or only once. Moreover, each one-time ID is unique among the one-time IDs which are valid at the time point it is issued.

The service provision server 30 supplies services upon the network. In this configuration, the service provision server 30 is, for example, managed by a company which administers an internet shop. Furthermore, the service provision server 30 includes a purchase management database 31, and supplies the service of selling goods. For goods purchased by users, this purchase management database 31 stores the product names, the prices, the destinations for dispatch of the goods (for example, the addresses of the users), and so on. It should be understood that the services supplied by the service provision server 30 are not limited to the above; for example, internet banking services or the like may be supplied by a financial institution, or internet services may be supplied to the population or the like by a public institution; the point is that any type of services which utilizes the network will be acceptable.

The number construction and authentication processing server 40 is managed, for example, by a credit card company which issues credit cards. The number construction and authentication processing server 40 includes an issued one-time ID management database 41 and a card member management database 42, and performs processing for constructing (reconstructing) credit card numbers and settlement checking processing which includes authentication on the basis of credit card numbers, and so on.

The issued one-time ID management database 41 stores one-time IDs which have been issued and numbers which consist of the portions A of the credit card numbers which correspond thereto. Here, the issue time periods of the one-time IDs are stored in correspondence with those one-time IDs, and it would be acceptable to arrange to delete the one-time IDs and the corresponding number portions A after a predetermined time period has elapsed from the time of issue thereof; or, alternatively, it would also be acceptable to arrange for the one-time IDs and the corresponding number portions A to be deleted after they have been used just once. The card member management database 42 manages credit card numbers and other data which is used in settlement checking processing which includes authentication (such as, for example, the periods of validity of the cards and the names of the cardholders and so on).

Next, a general outline of the processing performed by this authentication system 1 will be explained.

Here, it will be supposed that the user is a person who holds a credit card that has been issued by a credit card company.

When the user wishes to purchase some goods from an internet shop, first he inputs a number (the first symbol string) consisting of the portion A of his credit card number to his portable telephone device 10, and this number portion A is transmitted by the portable telephone device 10 to the ID issuance server 20 (FIG. 1(1)). Here, there is no danger of the entire credit card number leaking from the portable telephone device 10, since only a part of the number portion A, in other words only a pan of the credit card number, is inputted with the portable telephone device 10.

When the ID issuance server 20 receives the number portion A from the portable telephone device 10, it issues a one-time ID which is unique at this time point, transmits this one-time ID which it has issued to the portable telephone device 10 which transmitted the number portion A (FIG. 1(2)), stores the number portion A and the one-time ID in mutual correspondence in the one-time ID management database 21, and transmits the number portion A and the one-time ID to the number construction and authentication processing server 40 (FIG. 1(3)). Due to this, the one-time ID is received by the user of the portable telephone device 10, and is outputted (for example, is displayed). Moreover, since only the number portion A, in other words only a portion of the credit card number, is stored upon the ID issuance server 20, accordingly, even if this information should leak out from the ID issuance server 20, leakage does not take place of the entire credit card number.

The number construction and authentication processing server 40 stores the number portion A and the one-time ID which it has received from the ID issuance server 20 in the issued one-time ID management database 41.

Using his PC 11, the user accesses the website of the internet shop, in other words the service provision server 30, determines the goods which he wishes to purchase, and selects settlement by credit card. Thereafter, the user transmits to the service provider 10, with the PC 11, the one-time ID which is acquired with the portable telephone device 10. the number portion B of the credit card number (for example, the last eight digits thereof) (i.e., the second symbol string), and other data which is required during the purchase (for example, the name of the cardholder, the period of validity of the card, the name of the user, the destination for dispatch of the goods, and so on, i.e. the "user data for purchase") (FIG. 1(4)).

When the one-time ID, the number portion B of the credit card number (for example, the last eight digits thereof) (i.e., the second symbol string), and the user data for purchase are received by the service provision server 30 from the PC 11, then the data which is required for selling the goods, such as the name of the user, the destination for dispatch of the goods, the goods which have been purchased, and so on, is registered in the purchase management database 31. Moreover, the service provision server 30 transmits the one-time ID, the number portion B, the data which is required for settlement checking processing (authentication processing and so on) of the credit card (such as, for example, the name of the cardholder, the period of validity of the card, and so on: i.e., the "other data for settlement") to the number construction and authentication processing server 40 (FIG. 1(5)).

And, upon receipt of the one-time ID, the number portion B, and the other data for settlement, the number construction and authentication processing server 40 acquires the number portion A which corresponds to this one-time ID which has been received from the issued one-time ID management database 41, and constructs (reconstructs) the entire credit card number on the basis of the number portion B which has been received and the number portion A which has been acquired. Next, the number construction and authentication processing server 40 refers to the card member management database 42, and performs settlement checking as to whether or not purchase of the goods is permitted, on the basis of the credit card number and the other data for settlement. In this settlement checking, along with performing authentication as to whether or not this is a legitimate user, moreover, if the authentication has succeeded, in other words if this is a legitimate user, then confirmation is further performed as to whether or not the purchase is within the permitted range. In this authentication as to whether or not this is a legitimate user, the authentication succeeds if the credit card number, the name of the cardholder, and the period of validity match the data which is held in the card member management database 42, then the authentication succeeds, whereas, if the data does not match, then the authentication fails. Furthermore, whether or not the purchase is within the permitted range is determined according to whether or not the cost of the goods being purchased is within the permitted cost range, which is approved for this user in advance.

Next, the number construction and authentication processing server 40 transmits the settlement checking result to the service provision server 30 (FIG. 1(6)).

On the one hand, if the result of settlement checking from the number construction and authentication processing server 40 is success, then the service provision server 30 considers that this order from the user is valid, and processing is performed for starting the dispatch of the goods which have been specified for purchase, while, on the other hand, if the result of the settlement checking is failure, then this order from the user is considered to be invalid, so that processing is started for revocation of this order from the user. And the service provision server 30 transmits the result as to whether the order is valid or invalid to the PC 11 (FIG. 1(7)).

Next, the details of processing performed by this authentication system will be explained using the flow charts shown in FIGS. 2 through 6.

Figure 2:
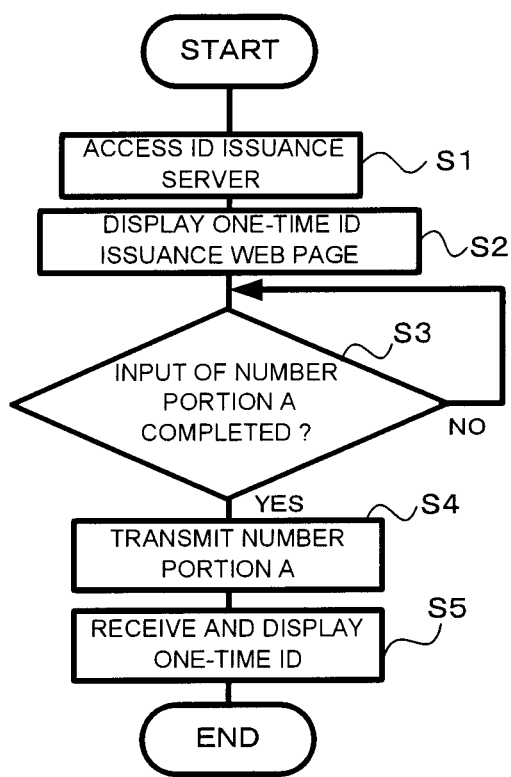
FIG. 2 is a flow chart of processing performed by a portable telephone device according to the first configuration.

FIG. 2 is a flow chart of processing performed by the portable telephone device, according to the first configuration.

When a command is issued by the user to access the ID issuance server 20, the portable telephone device 10 accesses the ID issuance server 20, and requests a web page from the ID issuance server 20 (a step S1). Next, the portable telephone device 10 receives this one-time ID issuance web page which Is transmitted from the ID issuance server 20, and displays this one-time ID issuance web page upon the screen (a step S2).

The portable telephone device 10 makes a decision as to whether or not the input of the number portion A to the one-time ID issuance web page has been completed (a step S3), and if it has not been completed (NO in the step S3), then it waits until it is completed; while, when it has been completed (YES in the step S3), then it transmits the number portion A which has been inputted to the ID issuance server 20 (a step S4, FIG. 1(1)). Thereafter, the portable telephone device 10 receives a web page including the one-time ID which is transmitted from the ID Issuance server 20, and displays if upon the screen (a step S5).

Since, in this manner, with the authentication system 1 according to this configuration, only the number portion A related to the credit card number is inputted and transmitted by the portable telephone device 10, accordingly there is no risk of the entire credit card number leaking from the portable telephone device 10.

Figure 3:
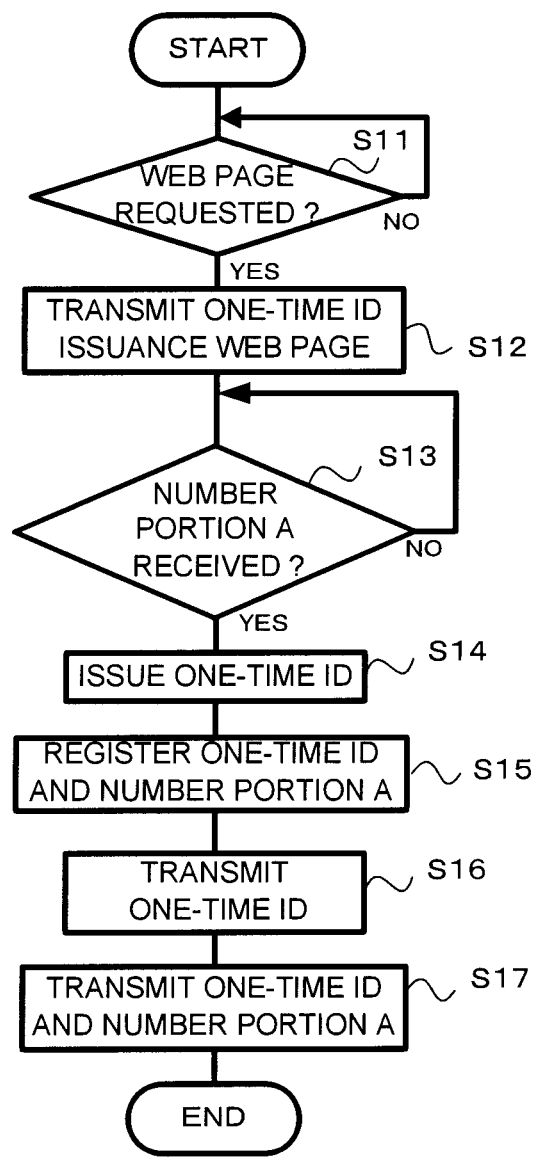
FIG. 3 is a flow chart of processing performed by an ID issuance server, according to the first configuration.

FIG. 3 is a flow chart of processing performed by the ID issuance server, according to the first configuration.

The ID issuance server 20 decides whether or not a web page has been requested from the user of any portable telephone device 10 (a step S11), and if no web page has been requested, then does nothing, but, on the other hand, if a web page has been requested (YES in the step S11), then it transmits a one-time ID issuance web page to the portable telephone device 10 which was the source of the request (a step S12, and FIG. 1(2)).

Next, the ID issuance server 20 decides whether or not the number portion A has been received from the portable telephone device 10 (a step S13), and, if the number portion A has not been received, waits until it is received, whereas, when the number portion A has been received (YES in the step S13), it issues a one-time ID which corresponds to this number portion A (a step S14), and registers this one-time ID and the number portion A in the one-time ID management database 21 (a step S15), transmits a web page which includes the one-time ID to the portable telephone device 10 (a step S16), and moreover transmits the one-time ID which has been registered in the one-time ID management database 21 and the number portion A to the number construction and authentication processing server 40 (a step S17, and FIG. 1(3)).

Figure 4:
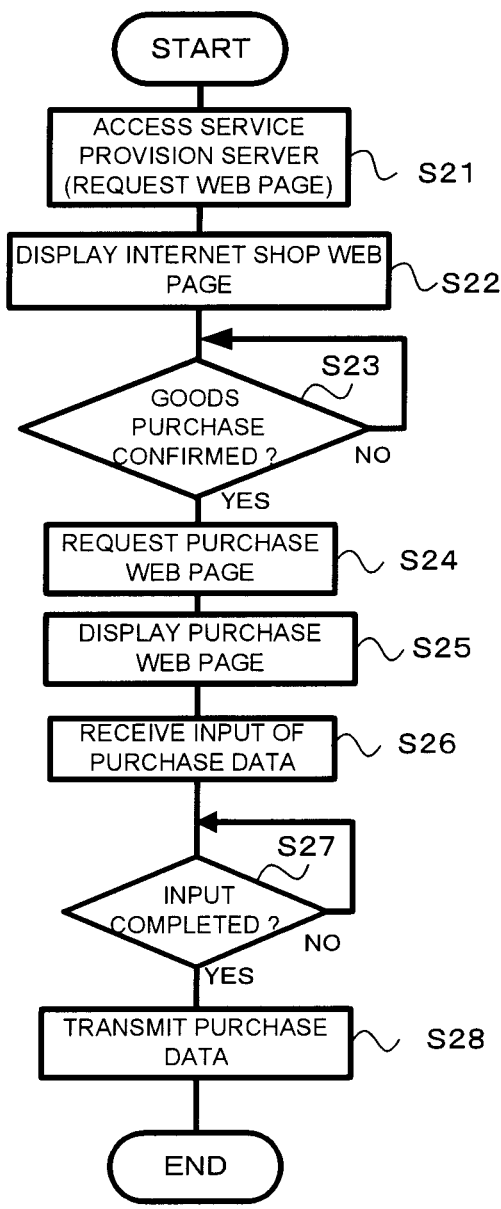
FIG. 4 is a flow chart of processing performed by a PC, according to the first configuration.

FIG. 4 is a flow chart of processing performed by the PC, according to the first configuration.

Upon receipt of an access request from the user to the web site of the internet shop, in other words to the service provision server 30, the PC 11 requests a web page from the service provision server 30 (a step S21), and receives this web page of the internet shop from the service provision server 30 and displays it upon the screen (a step S22).

Next, the PC 11 decides whether or not a confirmation of purchase of goods has been received from the user (a step S23), and, if the purchase of the goods has not been confirmed (NO in a step S23), waits until it is confirmed; whereas, if the purchase of the goods has been confirmed (YES in the step S23), then it requests the service provision server 30 to transmit a purchase web page (a step S24).

Next, the PC 11 receives the purchase web page from the service provision server 30 and displays it upon the screen (a step S25). And, upon this purchase web page, the PC 11 receives from the user input of various types of data necessary for the purchase (a step S26). In this configuration, the PC 11 receives input of the one-time ID which the user acquired with the portable telephone device 10, the number portion B of the credit card number of the user (the second symbol string), and other data required for the purchase (for example, the name of the cardholder, the period of validity of the card, the name on the user, the destination for dispatch of the goods, and so on).

Thereafter, the PC 11 decides whether or not the inputting of the data required for the purchase has been completed (a step S27), and, if it has not been completed (NO in the step S27), waits until it is completed; whereas, when the input has been completed (YES in the step S27), it transmits the data which has been inputted to the service provision server 30 (a step S28).

Since, in this manner, with the authentication system according to this configuration, in relation to the credit card number, only the number portion B is inputted and transmitted by the PC 11, accordingly there is no possibility of leakage of the entire credit card number from the PC 11. Moreover, even if the one-time ID and the number portion B should leak out, since the one-time ID is a temporary ID or one that can only be used once, accordingly it is possible to prevent purchase of goods or the like being performed by using them, in an appropriate manner.

Figure 5:
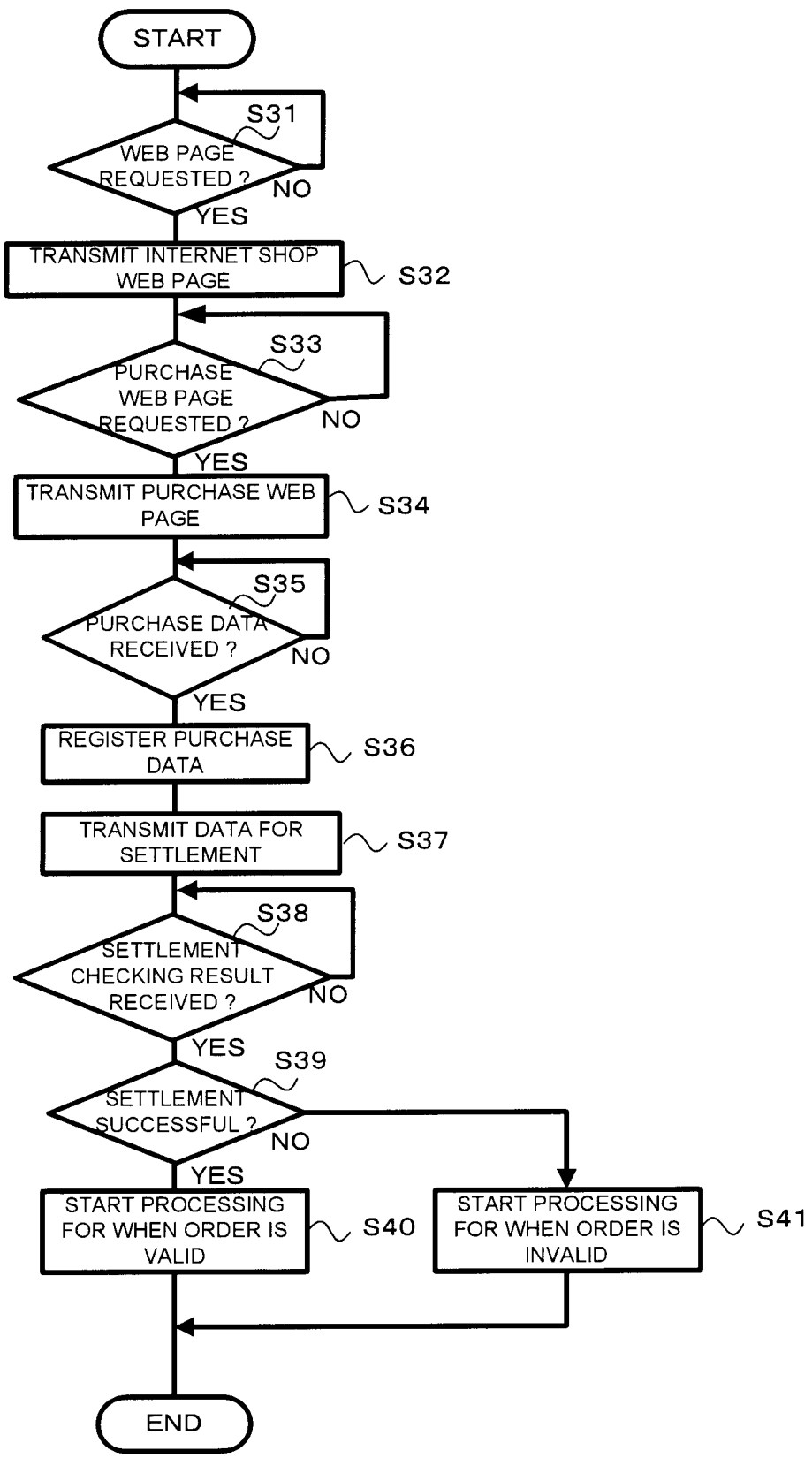
FIG. 5 is a flow chart of processing performed by a service provision server, according to the first configuration.

FIG. 5 is a flow chart of processing performed by the service provision server, according to the first configuration.

The service provision server 30 decides whether or not a web page request has been received from the PC 11 (a step S31), and, if there has been no web page request (NO in the step S31), waits until a web page request arrives; whereas, if there has been a web page request (YES in the step S31), it transmits an internet shop web page to the PC 11 which originated the request (a step S32).

Next, the service provision server 30 decides whether or not a purchase web page request has been received from the PC 11 (a step S33), and, if there has been no purchase web page request (NO in the step S33), waits until a purchase web page request arrives; whereas, if there has been a purchase web page request (YES in the step S33), it transmits an purchase web page to the PC 11 which originated the request (a step S34).

Thereafter, the service provision server 30 decides whether or not purchase data has been received (a step S35), and if purchase data has not been received (NO In the step S35), waits until such purchase data is received; whereas, if purchase data has been received (YES in the step S35), it registers the necessary data from within this purchase data, such as for example the name of the user, the destination for dispatch of the goods, and so on, in the purchase management database 31 (a step S36).

Next, the service provision server 30 transmits the data for settlement (for example, the one-time ID, the number portion B of the credit card number, the name of the cardholder, the period of validity of the card, the amount of money to be paid for the goods, and so on) to the number construction and authentication processing server 40 (a step S37, and FIG. 1(5)).

Thereafter, the service provision server 30 decides whether or not the settlement checking result has been received from the number construction and authentication processing server 40 (a step S38), and, if the settlement checking result has not been received (NO in the step S38), waits until the settlement-checking result is received; whereas, when the settlement checking result has been received (YES in the step S38), it makes a decision as to whether or not the settlement checking results is that the settlement has succeeded (a step S39).

Next, if the settlement checking result is success, then, since this means that the purchase with the corresponding credit-card is possible, accordingly the service provision server 30 starts processing for when the order is valid (processing for when the order is valid: for example, processing to transmit to some predetermined terminal the necessary data required for processing to send to the user the goods for which the order has been received, processing to transmit the order result that the order has succeeded, and so on) (a step S40). On the other hand, if the settlement checking result is failure, then, since this means either that authentication with the credit card number has failed, or that although this authentication has succeeded the price limit has been exceeded, accordingly the service provision server 30 starts processing for when the order is to be cancelled (processing for when the order is invalid: for example, processing to delete the data for the goods for which the order was received, processing to transmit the order result that the order has failed, and so on) (a step S41).

In this manner, with the authentication system 1 according to this configuration, since, in relation to the credit card number, the service provision server 30 only receives the number portion B, accordingly there is no danger of leakage of the entire credit card number from the service provision server 30. Moreover, even if the one-time ID and the number portion B should leak out, since the one-time ID is a temporary ID or one that can only be used once, accordingly it is possible to prevent purchase of goods or the like being performed by using them, in an appropriate manner.

Figure 6:
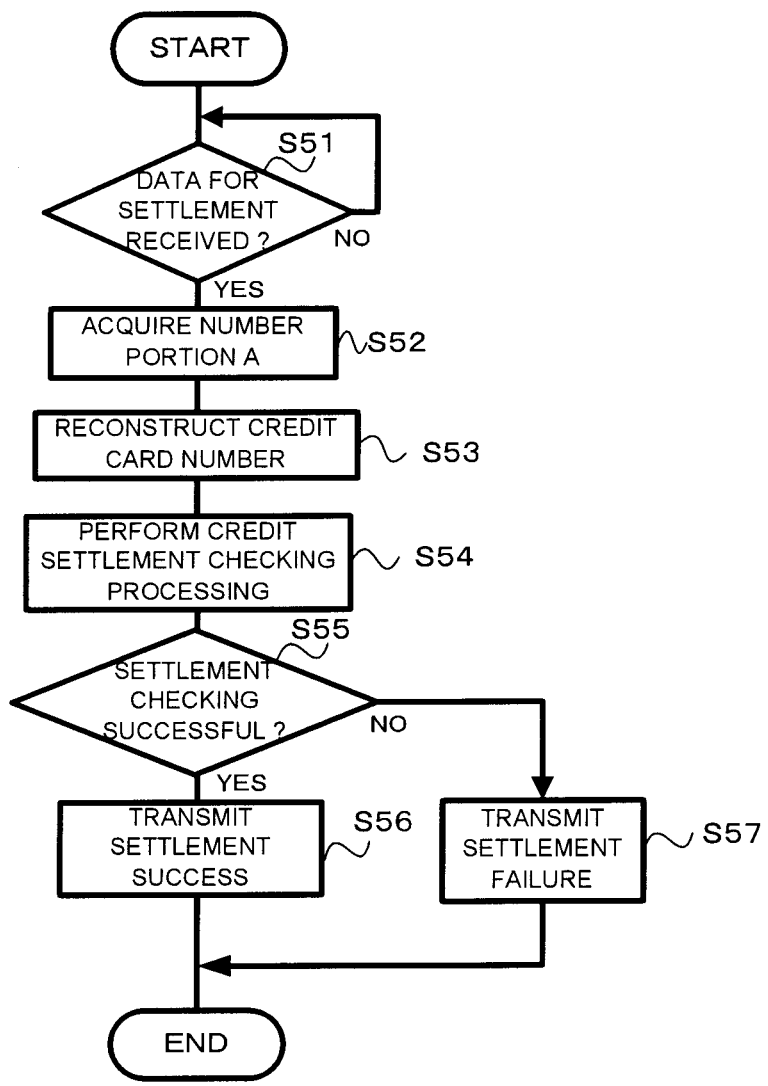
FIG. 6 is a flow chart of processing performed by a number construction and authentication processing server according to the first configuration.

FIG. 6 is a flow chart of the processing by the number construction and authentication processing server according to the first configuration.

The number construction and authentication processing server 40 decides whether or not the one-time ID, the number portion B, the other data for settlement and so on have been received from the service provision server 30 (a step S51), and if they have not been received (NO in the step S51), waits until they are received; whereas, if they have been received (YES in the step S51), it acquires the number portion A on the basis of the one-time ID (a step S52). In this configuration, the number construction and authentication processing server 40 acquires the number portion A from the issued one-time ID management database 41 by searching in it for that number portion A which is in correspondence with a one-time ID which is the same as the one-time ID which has been received from the service provision server 30. It should be understood that the number construction and authentication processing server 40 performs processing to sequentially receive from the ID issuance server 20 the number portions A and the corresponding one-time IDs which have been issued, and to store these number portions A and these one-time IDs which have thus been received in the issued one-time ID management database 41.

Next, the number construction and authentication processing server 40 constructs the whole credit card number from the number portion A which it has acquired and the number portion B which it has received from the service provision server 30 (a step S53). In this configuration, the number construction and authentication processing server 40 constructs the credit card number by simply joining together the number portion A and the number portion B.

Thereafter, the number construction and authentication processing server 40 refers to the card member management database 42, and performs credit settlement checking processing (a step S54). In concrete terms, the number construction and authentication processing server 40 performs authentication of the user, according to whether the credit card number which it has reconstructed, the name of the cardholder which has been transmitted from the service provision server 30, and the period of validity of the card, and the data in the card member management database 42, agree with one another, or not. Moreover, if the authentication of the user has been successful (i.e. if there is agreement with the data in the card member database 42), then the number construction and authentication processing server 40 decides whether or not the amount of money for the goods in the data for settlement is within the amount of money permitted for the user in the card member management database 42. If the result is that, along with the authentication of the user having succeeded, the amount of money for purchase of the goods is within the permitted amount of money, then the settlement checking is successful, while in other cases the settlement checking fails.

And the number construction and authentication processing server 40 decides whether or not the settlement checking has succeeded (a step S55), and if the settlement checking has succeeded (YES in the step S55), then the number construction and authentication processing server 40 transmits the result that the settlement checking has succeeded to the service provision server 30 (a step S56), whereas if the settlement checking has failed (NO in the step S55), then the number construction and authentication processing server 40 transmits the result that the settlement checking has failed to the service provision server 30 (a step S57).

In this manner, with this authentication system 1 according to the first configuration, the number construction and authentication processing server 40 constructs the credit card number in an appropriate manner from the number portion A and the number portion B into which it was divided, and is able to perform appropriate authentication using this credit card number.

Next, an authentication system according to a second configuration will be explained. It should be understood that, to portions which are the same as the first configuration, the same reference symbols are allotted.

Figure 7:
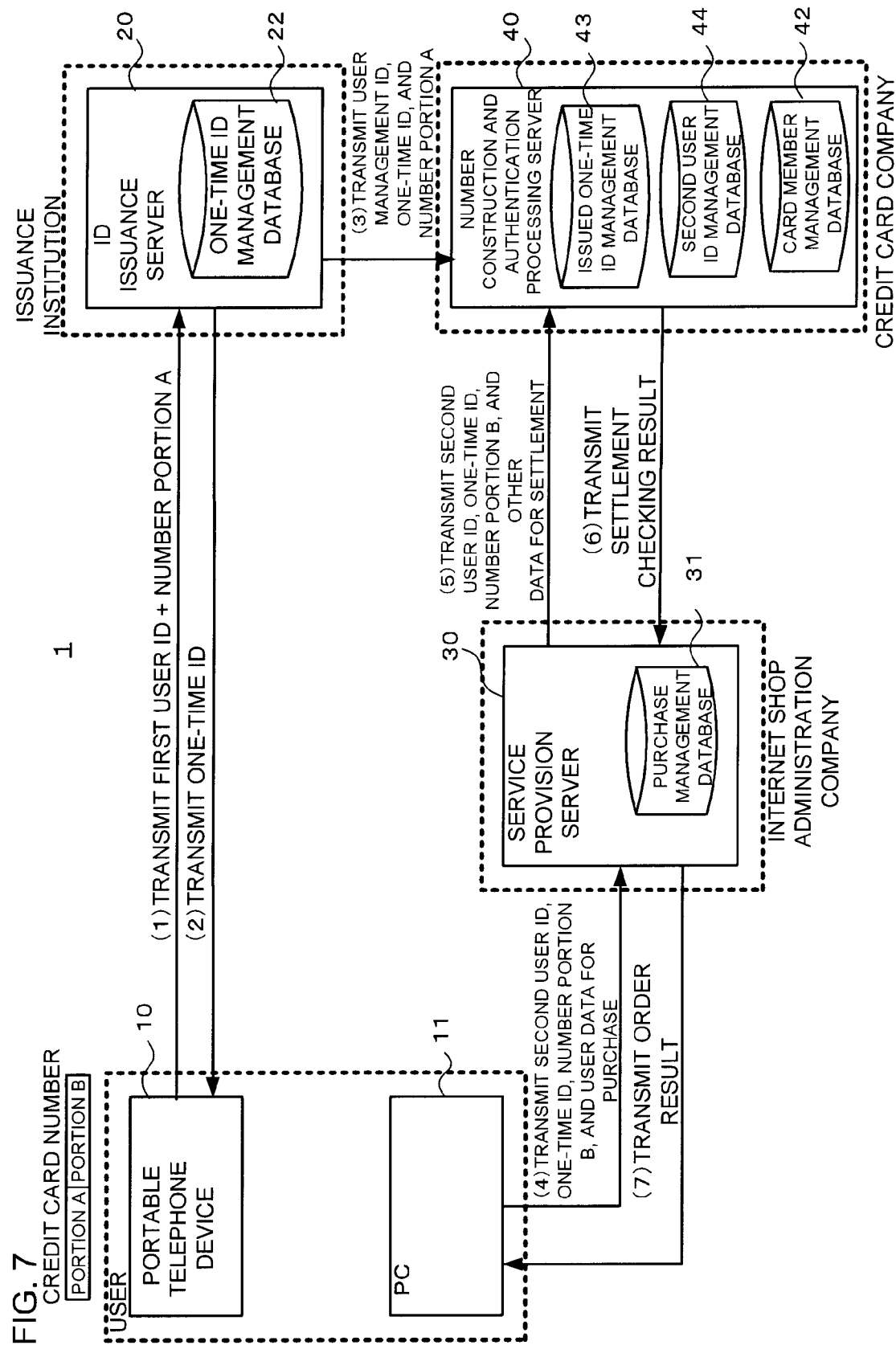
FIG. 7 is a figure for explanation of the schematic structure and processing of an authentication system according to a second configuration.

FIG. 7 is a figure for explanation of the schematic structure and processing of an authentication system 1 according to the second configuration.

The ID issuance server 20 of the authentication system 1 according to the second configuration maintains a one-time ID management database 22, instead of the one-time ID management database 21 of the first configuration.

The one-time ID management database 22 stores first user IDs for authenticating users (for example, the terminal IDs of portable telephone devices 10 or user identification codes (PIN codes): "first authentication keys"), the number portions A of credit card numbers, the one-time IDs which have been issued to those numbers, and user management IDs, in mutual correspondence. Here, the user management IDs are managed so as to be the same if the user in the one-time ID management database 22, and the user in a second user ID management database 44 (which will be described hereinafter) are the same. As such a method for managing the same users with the same user management IDs, for example, a method may be adopted of getting this information registered in the ID issuance server 20 by making it possible for the user to apply to use this authentication system 1 by sending documents containing information of various types to the credit card company by mail, so that when, on its side, the credit card company receives this application, it registers a management ID for this user in the number construction and authentication server 40, and notifies this user management ID to the side of the ID issuance institution. It should be understood that, if no one-time ID issue request has been made from a portable telephone device 10, then data is not stored for a number portion A and a one-time ID in the one-time ID management database 22.

Furthermore, the number construction and authentication processing server 40 according to this configuration, maintains an issued one-time ID management database 43 instead of the issued one-time ID management database 41 of the first configuration, and also maintains a second user ID management database 44.

The one-time IDs which have been issued, the number portions A of the corresponding credit card numbers, and the corresponding user management IDs are stored in this issued one-time ID management database 43. Here, the issue time periods of the one-time IDs are stored in correspondence with the one-time IDs, and it may be arranged to delete a one-time ID and the corresponding number portion A and user management ID for which a predetermined time period from the issue date has elapsed; or it would also be acceptable to arrange to delete a one-time ID and the corresponding number portion A and management ID after they have been used only once.

Second user IDs (second authentication keys) for authenticating the users and the user management IDs of said users are stored in mutual correspondence in the second user ID management database 44. Here, a second user ID is notified to a user in advance by letter or the like, when he has applied to utilize this authentication system 1.

Next, an outline of the processing by this authentication system 1 according to the second configuration will be explained.

Here, it will be supposed that the user is a person who holds a credit card that has been issued by a credit card company. Moreover, it will be supposed that the user has made an application to utilize this authentication system 1, and that a user management ID which has been allocated to the user and a PIN code (a first user ID) of the portable telephone device 10 of the user which serves as a first user ID are registered in the one-time ID management database 22 of the ID issuance server 20. Furthermore, it will be supposed that a user management ID which is the same as the user management ID registered in the one-time ID management database 22, and a second user ID which is notified to the user, are registered in the second user ID management database 44 of the number construction and authentication processing server 40.

When the user wishes to purchase some goods from an internet shop, first, he inputs a number consisting of the portion A of his credit card number (for example, the first eight digits thereof) to his portable telephone device 10, and this number portion A is transmitted to the ID issuance server 20 by the portable telephone device 10. Here, it is arranged for the PIN code to be automatically transmitted from the portable telephone device 10, so that the number portion A and the PIN code are transmitted to the ID issuance server 20 (FIG. 7(1)).

And here, in relation to the credit card number, since only a part of the number portion A is inputted with the portable telephone device 10, accordingly there is no danger of the entire credit card number leaking from the portable telephone device 10.

When the ID issuance server 20 receives the number portion A and the PIN code from the portable telephone device A, it performs a first stage of individual person authentication by comparing the PIN code which it has received with the PIN code in the one-time ID management database 22. And, if this individual person authentication has succeeded, in other words if the same PIN is present in the database 22, then the ID issuance server 20 issues a one-time ID which is unique at this time point, and transmits this one-time ID which it has issued to the portable telephone device 10 (FIG. 7(2)). It should be understood that, if the individual person authentication has failed, an error is returned to the portable telephone device 10, and no one-time ID is issued. Moreover, the ID issuance server 20 stores the one-time ID which has been issued and the number portion A in the one-time ID management database 22, in correspondence with the PIN code and the user management ID. Furthermore, the ID issuance server 20 transmits the number portion A, the one-time ID which has bees issued, and the user management ID for the corresponding user, to the number construction and authentication processing server 40 (FIG. 7(3)).

Due to this, the one-time ID is received by the user of the portable telephone device 10, and is outputted (for example, is displayed). Moreover, since only the number portion A, in other words only a portion of the credit card number, is stored upon the ID issuance server 20, accordingly, even if this information should leak out from the ID issuance server 20, leakage does not take place of the entire credit card number. Furthermore, since the individual person authentication is performed by the ID issuance server 20 with the PIN code which is stored upon the portable telephone device 10, accordingly it is possible to prevent, in an appropriate manner, any one-time ID from being issued, if a PIN code which is not registered has been transmitted.

The number construction and authentication processing server 40 stores the number portion A, the one-time ID, and the user management ID which have been received from the ID issuance server 20 in the issued one-time ID management database 43.

Using his PC 11, the user accesses the website of the internet shop, in other words the service provision server 30, determines the goods which he wishes to purchase, and selects settlement by credit card. Thereafter, the user transmits to the service provider 30, with the PC 11, the second user ID, the one-time ID which is acquired with the portable telephone device 10, the number portion B of the credit card number (for example, the last eight digits thereof), and other data which is required during the purchase (for example, the name on the card, the period of validity of the card, the name of the user, the destination for dispatch of the goods, and so on, i.e. the "user data for purchase") (FIG. 7(4)).

When the second user ID, the one-time ID, the number portion B of the credit card number, and the user data for purchase are received by the service provision server 30 from the PC 11, then the data which is required for selling the goods, such as the name of the user, the destination for dispatch of the goods, the goods which have been purchased, and so on, is registered in the purchase management database 31. Next, the service provision server 30 transmits the second user ID, the one-time ID, the number portion B, the data which is required for settlement checking processing (authentication processing and so on) of the credit card (such as, for example, the name of the cardholder, the period of validity of the card, the amount of money to be paid for the goods, and so on: i.e., the "other data for settlement") to the number construction and authentication processing server 40 (FIG. 7(5)).

And, upon receipt of the second user ID, the one-time ID, the number portion B, and the other data for settlement, the number construction and authentication processing server 40 performs a second stage of individual person authentication, using the second user ID and the one-time ID. That is, the number construction and authentication processing server 40 acquires the user management ID which corresponds to the second user ID which has been received from the second user ID management database 44, acquires the one-time ID which corresponds to the user management ID which has been acquired from the issued one-time ID management database 43, and performs authentication by comparing together the one-time ID which has been acquired and the one-time ID which has been received from the service provision server 30.

In this second stage of individual person authentication, the authentication is considered to have succeeded if the one-time ID which has been acquired and the one-time ID which has been received from the service provision server 30 match one another, whereas this individual person authentication is considered to have failed, if no user management ID corresponding to the second user ID which has been received can be acquired from the second user ID management database 44, or if it is not possible to acquire from the issued one-time ID management database 43 a one-time ID corresponding to the user management ID which has been acquired, or if the one-time ID which has been acquired and the one-time ID which has been received from, the service provision server 30 do not match one another.

If this second stage of authentication has succeeded, the number construction and authentication processing server 40 acquires the number portion A which corresponds to the one-time ID which has matched from the issued one-time ID management database 43, constructs the entire credit card number on the basis of the number portion B which has been received and the number portion A which has been acquired, and refers to the card member management database 42 and performs settlement checking as to whether or not purchase of the goods is permitted, on the basis of the credit card number and the other data for settlement.

And the number construction and authentication processing server 40 transmits the result settlement checking (including also the result of authentication if the second stage of authentication has failed) to the service provision server 30 (FIG. 7(6)).

On the one hand, if the result of settlement checking from the number construction and authentication processing server 40 is success, then the service provision server 30 considers that this order from the user is valid, and processing is performed for starting the dispatch of the goods which have been specified for purchase; while, on the other hand, if the result of the settlement checking is failure, then this order from the user is considered to be invalid, so that processing is started for revocation of this order from the user. And the service provision server 30 transmits the result as to whether the order is valid or invalid to the PC 11 (FIG. 7(7)).

Next, the details of the processing by this authentication system according to the second configuration will be explained.

Figure 8:
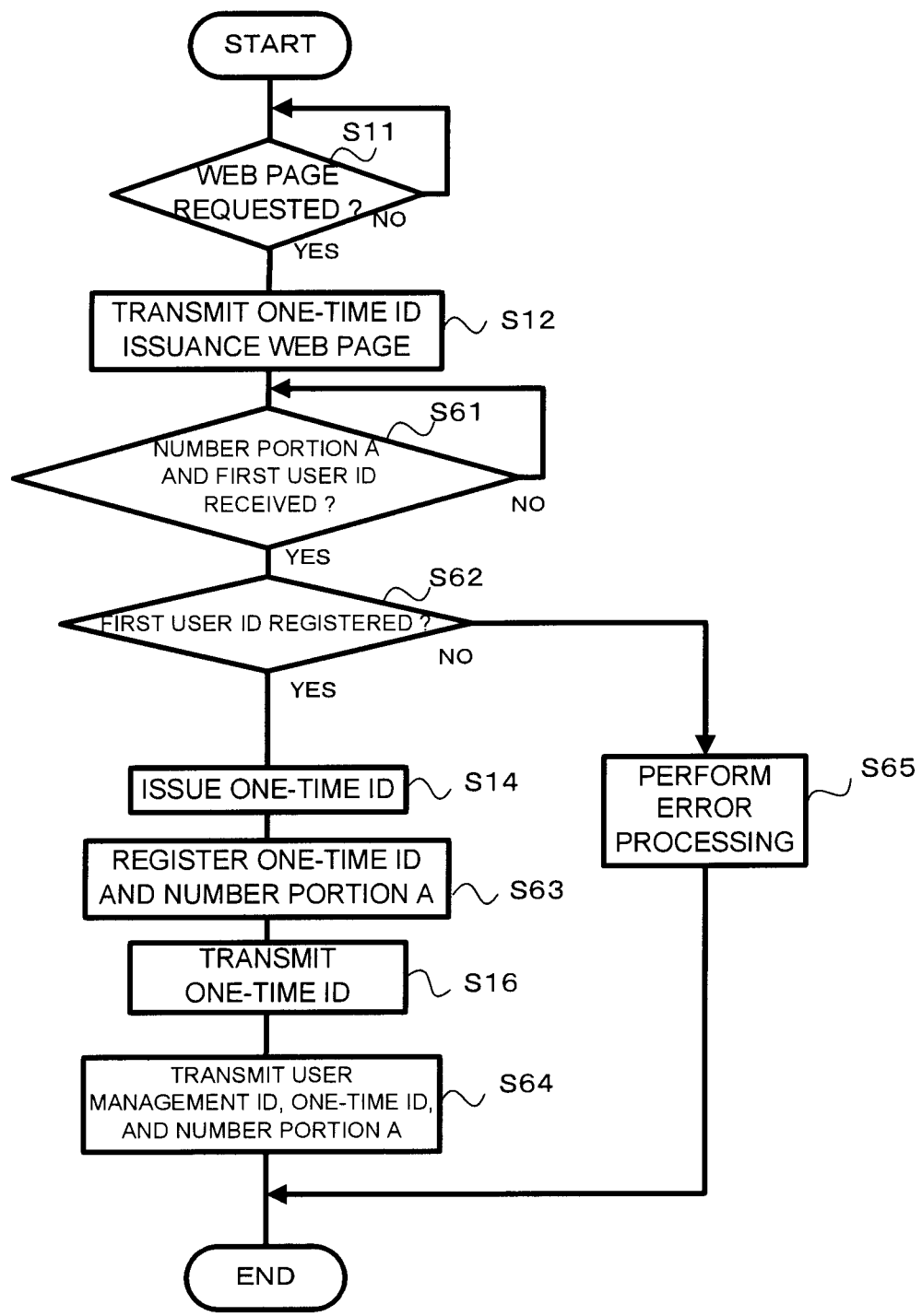
FIG. 8 is a flow chart of processing performed by an ID issuance server, according to the second configuration.

FIG. 8 is a flow chart, for the processing performed by the ID issuance server, according to the second configuration. It should be understood that, to processing steps which are the same as ones performed by the ID issuance server according to the first configuration shown in FIG. 3, the same reference symbols are appended, and explanation thereof is omitted.

In a step S61, the ID issuance server 20 decides whether or not the number portion A and the PIN code have been received from the portable telephone device 10, and, if the number portion A and the PIN code have not been received (NO in the step S61), waits until they are received; whereas, when they have been received (YES in the step S61), it performs the first stage of individual person authentication by comparing together the PIN code which has been received and the PIN code in the one-time ID management database 22.

And the ID issuance server 20 makes a decision as to whether or not this individual person authentication has succeeded, in other words as to whether or not the PIN code (the first user ID) is registered or not (a step S62).

If the result is that the individual person authentication has succeeded (YES in the step S62), then the flow of control proceeds to the step S14. On the other hand, if this authentication has failed (NO in the step S62), then error processing is executed for notifying to the portable telephone device 10 that a failure in authentication has taken place (a step S65).

After having performed the step S14, then the ID issuance server 20 stores the one-time ID which has been issued and the number portion A in the one-time ID management database 22 in correspondence with the PIN code and the user management ID (a step S63), and then the flow of control proceeds to the step S16.

Furthermore, after having performed the step S16, the ID issuance server 20 transmits the number portion A, the one-time ID which has been issued, and the corresponding user management ID of the corresponding user to the number construction and authentication processing server 40 (a step S64, and FIG. 7(3)).

Figure 9:
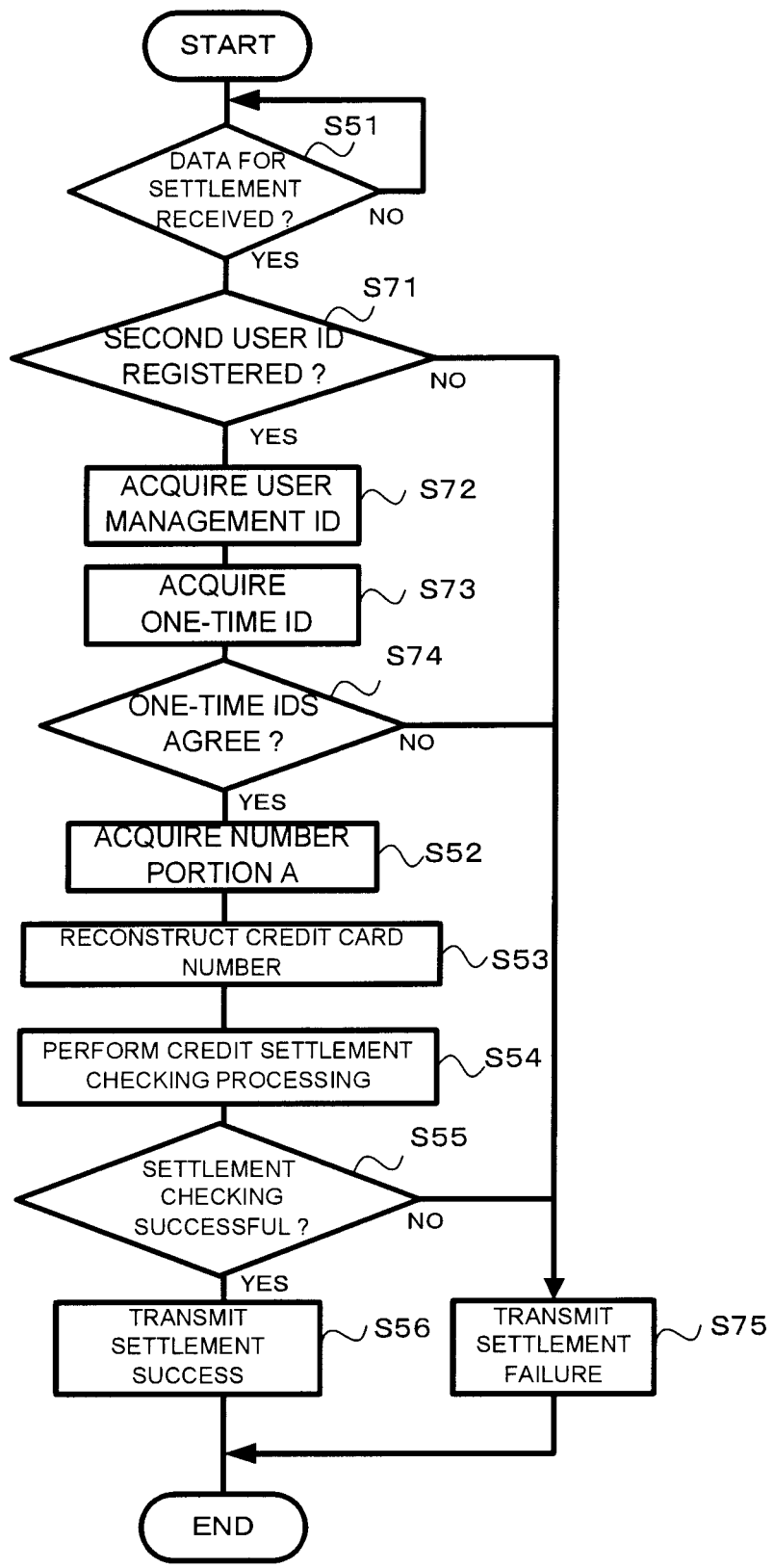
FIG. 9 is a flow chart of processing performed by a number construction and authentication processing server according to the second configuration.

FIG. 9 is a flow chart of processing performed by the number construction and authentication processing server according to the second configuration. It should be understood that, the same reference symbols are appended to processing steps which are the same as ones performed by the number construction and authentication processing server according to the first configuration shown in FIG. 6, and explanation thereof is omitted.

If the number construction and authentication processing server 40 has received the second user ID, the one-time ID, the number portion B, the data for settlement and so on from the service provision server 30 (YES in the step S51), then it makes a decision as to whether or not the second user ID which has been received is registered in the second user ID management database 44 (a step S71), and if it is not registered (NO in the step S71), then this means that this is not the user who is registered using the authentication which used that one-time ID, in other words, that the second stage of individual person authentication has failed, so that the flow of control is transferred to a step S75.

On the other hand, if the second user ID which has been received is registered in the second user ID management database 44 (YES in the step S71), then the number construction and authentication processing server 40 acquires from the second user ID management database 44 the user management ID corresponding to the second user ID which has been received (a step S72), acquires from the issued one-time ID management database 43 the one-time ID corresponding to the user management ID which has been acquired (a step S73), and makes a decision as to whether or not the one-time ID which has been acquired and the one-time ID which has been received from the service provision server 30 agree with one another (a step S74). If the result is that these two one-time IDs agree with one another (YES In the step S74), then, since this means that this is a user to whom the one-time ID was issued by the ID issuance server 20, accordingly the number construction and authentication processing server 40 decides that this second stage of individual person authentication has been successful, and the flow of control proceeds to the next step S52. On the other hand, if these two one-time IDs do not agree with one another (NO in the step S74), then, since this means that it has not been possible to authenticate the user to whom the one-time ID was issued by the ID issuance server 20, accordingly the number construction and authentication processing server 40 decides that this second stage of individual person authentication has failed, and the flow of control is transferred to the step S75.

In the step S75, the number construction and authentication processing server 40 transmits the fact that the second stage of authentication has failed, or the fact that the settlement checking processing has failed, to the service provision server 30 (FIG. 7(6)).

With the authentication system according to the second configuration described above, it is possible to prevent, in an appropriate manner, the issuance of a one-time ID to any device other than a portable telephone device 10 which provide a PIN code which is registered, so that it is possible appropriately to prevent any malicious action by a user who is not registered.

Furthermore, since the second stage of individual person authentication by the number construction and authentication processing server 40 does not succeed if the one-time ID and the second user ID do not agree with one another, accordingly it is possible appropriately to prevent improper usage by a third party, even if the portable telephone device 10 has been acquired by such a third party and a one-time ID has been (undesirably) issued. Moreover, by utilizing the one-time ID which is employed for the above type of advantage, it is possible to construct the credit card number in an appropriate manner, and to use it for authentication.

Next, an authentication system according to a third configuration will be explained. It should be understood that, to portions which are the same as the first and the second configurations, the same reference symbols are allotted.

FIG. 10 is a figure for explanation of the schematic structure and processing of an authentication system according to the third configuration.

The ID issuance server 20 of this authentication system 1 according to the third configuration maintains a one-time ID management database 23 instead of the one-time ID management database 22 of the second configuration. And the ID issuance server 20 also maintains a shop ID management database 24.

The one-time ID management database 23 stores first user IDs for authenticating users (for example, the telephone numbers of portable telephone devices 10), and the number portions A of credit card numbers, in mutual correspondence. It should be understood that, if no one-time ID issue request has been, made from a portable telephone device 10, then data is not stored for a number portion A and a one-time ID in the one-time ID management database 23.

The shop ID management database 24 stores IDs of shops (shop IDs) of shops which can perform settlement by issue of one-time IDs.

Furthermore, the number construction and authentication processing server 40 according to this configuration maintains an issued one-time ID management database 45 instead of the issued one-time management database 43 of the second configuration.

The one-time IDs which have been issued, the number portions A of the corresponding credit card numbers, and the telephone numbers of the portable telephone devices 10 to which these one-time IDs were issued, are stored in this issued one-time ID management database 45. Here, the issue time periods of the one-time IDs are stored in correspondence with the one-time IDs, and it may be arranged to delete a one-time ID and the corresponding number portion A and telephone number for which a predetermined time period from the issue date has elapsed; or it would also be acceptable to arrange to delete a one-time ID, the corresponding number portion A, and the corresponding telephone number after they have been used only once.

The service provision server 30 according to this configuration maintains a user management database 32, instead of the user management database 31 of the second configuration.

IDs for internet shopping of the users, the addresses of those users, and their telephone numbers and so on are stored in this user management database 32. The addresses and telephone numbers in the user management database 32 may, for example, be registered by the user transmitted them to the service provision server 30 when starting to utilize the services of the service provision server 30. Or the ID of the user for internet shopping may be notified in advance to the user, when he has registered for the services of the service provision server 30.

Next, an outline of the processing performed by this authentication system 1 according to the third configuration will be explained.

Here, it will be supposed that the user is a person who is registered upon the service provision server 30 for receiving the benefit of services, and that the address of the user and the telephone number of the portable telephone device 10 of the user are registered in the user management database 32. Moreover, it will be supposed that an ID for internet shopping has been notified to the user.

First, according to a command from the user, the PC 11 displays a web page for purchase of goods from the service provision server 30, and, along with receiving specification of the goods, the PC 11 receives specification of settlement by credit card, and moreover receives input of the user's ID for internet shopping.

The PC 11 transmits the ID for internet shopping to the service provision server, along with the specification of the goods and the specification of settlement (FIG. 10(1)).

The service provision server 30 performs user authentication with the internet shopping ID which has been transmitted, and, if this authentication has succeeded, transmits to the ID issuance server 20 the telephone number of the user which is stored in the user management database 32 and the shop ID which is allocated from the credit card company in advance (FIG. 10(2)).

The ID issuance server 20 decides whether or not the shop ID which it has received from the service provision server 30 is stored in the shop ID management database 42, and, if the shop ID is stored, then it registers the telephone number which it has received in the one-time ID management table 23. Due to this, it is not necessary for the user himself to register the telephone number of his own portable telephone device 10 with the ID issuance server 20.

Here, with this authentication system 1, for the user to perform credit card settlement with the service provision server 30, it is necessary for him to telephone with his portable telephone device 10 to a predetermined telephone number to which the ID issuance server 20 can respond.

When the user has telephoned with his portable telephone device 10 to the predetermined telephone number to which the ID issuance server 20 can respond, the ID issuance server 20 starts a telephone conversation with the portable telephone device 10, and acquires the telephone number of the portable telephone device 10 (i.e., its caller number). And the ID issuance server 20 makes a decision as to whether or not this telephone number which it has acquired is stored in the one-time ID management database 23, and, if this telephone number is so stored, then the server 20 transmits audio to the portable telephone device 10 which commands the user to input the number portion A by key input, and recognizes the number portion A from audio due to key input by the user upon the portable telephone device 10 (FIG. 10(3)).

The ID issuance server 20 issues a one-time ID which is unique at this time point, and transmits this one-time ID which it has determined to the portable telephone device 10 via audio (FIG. 10(4)). By doing this, the one-time ID is outputted as audio by the portable telephone device of the user, so that the user is able to ascertain this one-time ID as a sound.

Moreover, the ID issuance server 20 stores (as data) this one-time ID which has been issued, and the number portion A, in the one-time ID management database 23 in correspondence with the-corresponding telephone number. Next, the-ID issuance server 20 transmits the number portion A, the one-time ID which has been issued, and the corresponding telephone number to the number construction and authentication processing server 40 (FIG. 10(5)). Here since only the number portion A, which is only a part of the credit card number, is stored upon the ID issuance server 20, accordingly, even if this information should leak out from the ID issuance server 20, still there is no danger of the entire credit card number leaking out.

The number construction and authentication processing server 40 stores the number portion A which has been received from the ID issuance server 20, the one-time ID, and the telephone-number in the issued one-time ID management database 45.

Subsequently, according to a command from the user, the PC 11 transmits the internet shopping ID, the one-time ID which has been acquired by the portable telephone device 10, the number portion B of the credit card number, and the other data required for authentication (for example, the name on the-card and the period of validity of the card) to the service provision server 30 (FIG. 10(6)).

When the Internet shopping ID, the one-time ID, the number portion B of the credit card number, and the data for authentication have been received by the service provision server 30 from the PC 11, it registers the data such as the goods which have been purchased and so on in the user management database 32, and transmits the one-time ID, the number portion B, the telephone number, and the data which is required for the settlement checking processing of the credit card (authentication processing and so on) (for example, the name of the cardholder, the period of validity of the card, the amount of money to be paid for the goods, and so on: i.e., the other data for settlement) to the number construction and authentication processing server 40 (FIG. 10(7)).

And, upon receipt of the telephone number, the number portion B, and the other data for settlement from the service provision server 30, the number construction and authentication processing server 40 performs individual person authentication for the user by using the telephone number and the one-time ID. In other words, the number construction and authentication processing server 40 performs authentication according to whether or not any telephone number is stored in the issued one-time ID management database 45 corresponding to the telephone number which has been received. Moreover, the number construction and authentication processing server 40 acquires the one-time ID which corresponds to this telephone number from the issued one-time ID management database 45, and performs authentication by comparing together this one-time ID which has been acquired and the one-time ID which has been received from the service provision server 30.

If, in this individual person authentication, the one-time ID which has been acquired and the one-time ID which has been received from the service provision server 30 match one another, then the individual person authentication succeeds, whereas, if no telephone number corresponding to the telephone number which has been received is stored in the issued one-time ID management database 45, or if the one-time ID which has been acquired and the one-time ID which has been received from the service provision server 30 do not match one another, then the individual person authentication fails.

If the authentication has succeeded, then the number construction and authentication processing server 40 acquires the number portion A corresponding to the one-time ID which has matched from the issued one-time ID management database 45, constructs the credit card number on the basis of the number portion B which has been received and the number portion A which has been acquired, and performs settlement checking as to whether or not to permit purchase of the goods by referring to the card member management database 42 on the basis of the credit card number and the other data for settlement.

And the number construction and authentication processing server 40 transmits the result of the settlement checking (including the result of authentication if the authentication has failed) to the service provision server 30 (FIG. 10(8)).

If the result of the settlement checking from the number construction and authentication processing server 40 is that the checking has succeeded, then the service provision server 30 takes the order from the user as being valid, and performs processing for starting the dispatch of the goods which have been designated for purchase; whereas, on the other hand, if the result of the settlement checking is that it has failed, then the server 30 takes the order from the user as being invalid, and starts to perform processing for revoking this order from the user.

Next, a number construction and authentication processing server according to a variant configuration will be explained.

FIG. 11 is a structural diagram of a number construction and authentication processing server 40 according to a variant configuration. It should be understood that this variant configuration may be applied to any of the first through the third configurations, but here an example is shown in which it is applied to the first configuration.

This variant configuration is one in which the functioning of the number construction and authentication processing server 40 of the first configuration is implemented by a number construction server 40a and one or more authentication processing servers 40b.

The number construction server 40a is, for example, provided to a predetermined number construction company which has received permission from the credit card companies, and, in the number construction and authentication processing server 40, this server 40a: executes the processing to construct the credit card number, executes the processing to transmit the credit card number which has been constructed and the data required for settlement checking to an authentication processing server 40b (FIG. 11(1)); and executes processing to receive the settlement checking result from the settlement processing server 40b (FIG. 11(2)) and processing to transmit this result to the service provision server 30.

An authentication processing server 40b may be, for example, provided to each credit card company, and is a device which executes settlement checking processing including: authentication of a credit card number; transmission of the credit card number and the other data required for settlement checking from the source of the request (FIG. 11(1)); performing settlement checking on this basis of this data; and returning the result of this settlement checking to the source of the request (FIG. 11(2)).

According to this variant configuration it is possible to utilize, as such an authentication processing server 40b, a server which is already present at the credit card company and which is executing settlement confirmation processing, just as it is.

Next, a number construction and authentication processing server according to another variant configuration will be explained.

FIG. 12 is a structural diagram of a portion of an authentication system according to another variant configuration. It should be understood that, while this variant configuration may be applied to any of the first configuration through the third configuration, here, an example is shown in which it is applied to the first configuration.

As shown in FIG. 12A, it is arranged for this authentication system 1 to include a service and number construction and authentication processing server 50, which integrates together into one unit the functions of the service provision server 30 and of the number construction and authentication processing server 40. This structure is one which may, for example, be applied in a case in which network service and authentication are performed by a single organization (an internet service supply company), and may, for example, be applied to the network service of a financial institution, or network service by a public organization, or the like.

Moreover, as shown In FIG. 12B, it would also be acceptable to arrange to transmit the data such as the one-time ID, the number portion B, and so on from the PC 11 to the number construction and authentication processing server 40, for the number construction and authentication processing server 40 to construct the credit card number and perform the authorization and to notify the result thereof to the service provision server 30, and, if the result of this authentication result is success, for the service provision server 30 to start the supply of service via the PC (for example, the PC 11).

Although the present authentication system and method have been explained on the basis of configurations thereof, they are not limited to the details of those configurations; various other modes of configuration may be contemplated.

For example while, in the first configuration, it was arranged for the one-time ID which has been issued and the number portion A to be transmitted in advance to the number construction and authentication processing server 40, and for the searching of the number portion A which corresponds to the one-time ID which has been transmitted from the service provision server 30 to be performed by the number construction and authentication processing server 40, the authentication system and method are not to be considered as being limited by this feature. In addition, it would also be acceptable to arrange for the one-time ID which has been issued and the number portion A to be stored in the ID issuance server 20 without being transmitted to the number construction and authentication processing server 40, and for the number construction and authentication processing server 40 to transmit the one-time ID which has been received from the service provision server 30 to the ID issuance server 20, and tor the ID issuance server 20 to search for the number portion A which corresponds to the one-time ID and to transmit it to the number construction and authentication processing server 40.

Furthermore while, in the second configuration described above, the issued one-time ID, the number portion A, and the user management ID were transmitted in advance to the number construction and authentication processing server 40, the user management ID was specified by the number construction and authentication processing server 40 on the basis of the second user ID which was transmitted from the service provision server 30, and, with the user management ID and the one-time ID, the number portion A was searched for and was acquired, the authentication system and method are not to be considered as being limited by this feature. In addition, it would also be acceptable to arrange, not to transmit the issued one-time ID, the number portion A, and the user management ID to the number construction and authentication processing server 40, but to store them in the ID issuance server 20, for the number construction and authentication processing server 40 to specify the second user ID which has been received from the service provision server 30 and to transmit this user management ID which has been specified to the ID issuance server 20, for the ID issuance server 20 to acquire the one-time ID and the number portion A corresponding to this user management ID and to transmit them to the number construction and authentication processing server 40, and for the number construction and authentication processing server 40 to search for and to acquire the number portion A corresponding to this one-time ID; or, it would also be acceptable to arrange, not to transmit the issued one-time ID, the number portion A, and the user management ID to the number construction and authentication processing server 40, but to store them in the ID issuance server 20, and tor the number construction and authentication processing server 40 to acquire the number portion A, by the number construction and authentication processing server 40 specifying the user management ID from the second user ID which has been received from the service provision server 30 and transmitting this user management ID which has been specified and the one-time ID to the ID issuance server 20, and the ID issuance server 20 searching for and acquiring the number portion A corresponding to the one-time ID and the user management ID and transmitting it to the number construction and authentication processing server 40.

Furthermore while, in the first configuration through the third configuration described above, examples were shown in which the authentication was performed using the credit card number, the authentication system and method are not to be considered as being limited by that feature. For example, it is possible to apply the authentication system and method to a case in which authentication is performed by using a number of a network service of a financial institution (for example, an account number, a member ID, or the like), a personal number which is issued by a public institution, a log-in password to a service supply organization, a membership number of an internet shop, the address, name, telephone number, or email address of the user, or a combination thereof; the point is that a symbol string for authentication (an authentication symbol string) should be used. Here, any symbol string which consists of numerals, letters, symbols, or a combination of two or more of these would be acceptable as the authentication symbol string.

Furthermore although, in the configurations described above, the credit card number was separated into a front half portion and a rear half portion, i.e. into its first eight digits and its last eight digits, and it was arranged for them to be inputted by different terminals, the authentication system and method should not be considered as being limited by this feature. For example, it may be separated into two portions, each of which is to be inputted from a different terminal, by separating its odd numbered digits from its even numbered digits; or it may be separated so that some of predetermined digits (the last eight digits) of the credit card number belong to a different portion; the point is that it should be separated into two portions according to some predetermined rule, and that each of these portions should be inputted from a different terminal. Moreover, as the credit card number, apart from the number on the face of the card, it would also be acceptable to arrange to include the security code of the credit card, for example the CVV2 (Card Verification Value), the CVC2 (Card Verification Code), the CID (Card Identification Number) or the like.

Moreover while, in the first configuration through the third configuration described above, the PC 11 of the user was explained as being one example of a second terminal, this is not limitative of the authentication system and method; for example, it would also be acceptable for the second terminal to be a device which is supplied by the internet shop administration company, which can transmit data to the service provision server 30.

Furthermore while, in the third configuration described above, an example was given of the user of a portable telephone device 10, it would also be acceptable to arrange to utilize a fixed telephone device.

Furthermore while, in the first configuration through the third configuration described above, the authentication symbol string was divided into two parts by some method determined in advance and these two parts were transmitted via two different terminals, and the construction of the authentication symbol string was performed by the number construction and authentication processing server 40, it would also be acceptable, for example, to arrange for a separation method to be determined according to designation by the user, or according to designation by the ID issuance server 20, to arrange for the authentication symbol string to be transmitted by the two different terminals after having been separated into two parts according to this separation method, and to arrange for the number construction and authentication processing server 40 to receive notification of the separation method which was determined upon, and to reconstruct the authentication symbol string on the basis of this separation method. Moreover, it would also be acceptable to arrange for the portable telephone device 10 to determine the separation method for the authentication symbol string according to some predetermined algorithm, for the authentication symbol string to be divided into two parts according to this separation method and for these parts to be transmitted by different terminals, for the portable telephone device 10 to notify the method of separation which has been used to the number construction and authentication processing server 40, and for the number construction and authentication processing server 40 to reconstruct the authentication symbol string according to the separation method which has thus been notified.

The invention claimed is:

1. An authentication method, comprising:
   dividing a credit card number into a first portion and a second portion different from the first portion, the credit card number being completely reconstructable from the first portion and the second portion;
   transmitting (1) the first portion of the credit card number from a portable telephone device (10) of a user to an ID issuance server (20);
   transmitting (2) a one-time ID corresponding to the first portion of the credit card number from the ID issuance server to the portable telephone device (10);
   transmitting (3) the first portion of the credit card number and the one-time ID from the ID issuance server (20) to a number construction and authentication processing server (40);
   transmitting (4) the second portion of the credit card number, the one-time ID and user purchase data from a computer (11) of the user to a service provision server (30) via the internet;
   forming settlement data at the service provision server (30) from the purchase data;
   transmitting (5) the second portion of the credit card number, the one-time ID and the settlement data from the service provision server (30) to the number construction and authentication processing server (40);
   ensuring at the number construction and authentication processing server (40) that the one-time ID received with the second portion of the credit card number matches the one-time ID received with the first portion of the credit card number;
   reconstructing the full credit card number at the number construction and authentication processing server (40) from the first and second portions of the credit card number;
   forming a settlement checking result at the number construction and authentication processing server (40) from the full credit card number and the settlement data;
   transmitting (6) the settlement checking result from the number construction and authentication processing server (40) to the service provision server (30);
   forming an order result at the service provision server (30) from the settlement checking result; and
   transmitting (7) the order result from the service provision server (30) to the computer (11) of the user via the internet.

2. The authentication method of claim 1, wherein the transmitting steps (1) and (2) comprise the portable telephone device (10) performing the following steps:
   requesting (S1) a web page from the ID issuance server (20);
   receiving the requested web page from the ID issuance server (20);
   displaying (S2) the received web page;
   receiving (S3) the first portion of the credit card number from the user;
   transmitting (S4) the first portion of the credit card number to the ID issuance server (20);
   receiving (S5) a web page containing the one-time ID from the ID issuance server (20); and
   displaying (S5) the web page containing the one-time ID to the user.

3. The authentication method of claim 1, wherein the transmitting steps (1), (2) and (3) comprise the ID issuance server (20) performing the following steps:
   receiving (S11) a request for a web page from the portable telephone device (10);
   transmitting (S12) the requested web page to the portable telephone device (10);
   receiving (S13) the first portion of the credit card number from the portable telephone device (10);
   issuing (S14) a one-time ID corresponding to the first portion of the credit card number;
   registering (S15) the one-time ID and the corresponding first portion of the credit card number with a one-time ID management database (21);
   transmitting (S16) a web page containing the one-time ID to the portable telephone device (10); and
   transmitting (S17) the one-time ID and the corresponding first portion of the credit card number to the number construction and authentication processing server (40).

4. The authentication method of claim 1, wherein the transmitting step (4) comprises the computer (11) performing the following steps:
   requesting (21) a web page from the service provision server (30);
   receiving the requested web page from the service provision server (30);
   displaying (S22) the received web page;
   confirming (S23) with the user that goods are to be purchased;
   requesting (S24) a purchase web page from the service provision server (30);
   receiving the requested purchase web page from the service provision server (30);

displaying (S25) the received purchase web page;
receiving (S26) the purchase data from the user;
confirming (S27) with the user that the purchase data is complete; and
transmitting (S28) the purchase data to the service provision server (30).

5. The authentication method of claim 1, wherein the transmitting steps (4), (5) and (6) comprise the service provision server (30) performing the following steps:
receiving (S31) a request for an internet shop web page from the computer (11);
transmitting (S32) the requested internet shop web page to the computer (11);
receiving (S33) a request for a purchase web page from the computer (11);
transmitting (S34) the requested purchase web page to the computer (11);
receiving (S35) the purchase data from the computer (11);
registering (S36) the purchase data;
transmitting (S37) the settlement data to the number construction and authentication processing server (40);
receiving (S38) the settlement checking result from the number construction and authentication processing server (40);
confirming (S39) the success of the received settlement checking result; and
initiating (S40) processing for a valid order.

6. The authentication method of claim 1, wherein the transmitting steps (3), (5) and (6) comprise the number construction and authentication processing server (40) performing the following steps:
receiving (S51) the settlement data from the service provision server (30);
receiving (S52) the first portion of the credit card number and the one-time ID from the ID issuance server (20);
receiving (S52) the second portion of the credit card number and the one-time ID from the service provision server (30);
ensuring that the one-time ID received with the second portion of the credit card number matches the one-time ID received with the first portion of the credit card number;
reconstructing (S53) the full credit card number from the first and second portions of the credit card number;
forming (S54) the settlement checking result from the reconstructed mil credit card number and the received settlement data;
ensuring (S55) that the settlement checking result is successful; and
transmitting (56) the successful settlement checking to the service provision server (30).

7. An authentication system comprising:
an authentication server which performs authentication using an authentication symbol string,
a one-time ID issuance server, and
an authentication symbol string construction server, wherein:
said one-time ID issuance server comprises:
a first reception unit which receives, from a first terminal of a user, a first symbol string which is a portion of said authentication symbol string;
an ID issuance unit which issues a one-time ID to said first terminal; and
a one-time ID storage unit which stores said first symbol string and said one-time ID which has been issued in mutual correspondence; and
said authentication symbol string construction server comprises:
a second reception unit which receives, from a second terminal, a second symbol string which is the remaining portion of said authentication symbol string other than said first symbol string, and said one-time ID;
a first symbol string acquisition unit which acquires said first symbol string which corresponds to said one-time ID by communication with said one-time ID issuance server;
a construction unit which reconstructs said authentication symbol string on the basis of said first symbol string which has been received; and
an authentication symbol string transmission unit which transmits said authentication symbol string which has been reconstructed to said authentication server.

8. The authentication system of claim 7, wherein:
said one-time ID issuance server further comprises a first authentication key storage unit which stores a first authentication key of the user, and a management ID of said user;
said first reception unit acquires said first authentication key and said first symbol string from said first terminal of said user;
said one-time ID issuance server further comprises a first authentication key authentication unit which performs a first stage of authentication by comparing said first authentication key which has been received, with said first authentication key which is stored in said authentication key storage unit;
said ID issuance unit issues said one-time ID if said authentication has succeeded;
said one-time ID storage unit stores said one-time ID, said first symbol string, and said management ID of the user for which authentication has succeeded, in mutual correspondence;
said second reception unit of said authentication symbol string construction server receives, from said second terminal, a second authentication key of said user, said second symbol string, and said one-time ID;
said authentication symbol string construction server further comprises:
a second authentication key storage unit which stores said second authentication key of the user and the management ID of said user; and
a management ID acquisition unit which acquires the management ID which corresponds to said second authentication key which has been received from said second authentication key storage unit; and
said first symbol string acquisition unit acquires said first symbol string on the basis of said management ID which has been acquired and said one-time ID which has been received.

9. The authentication system of claim 8, wherein:
said first terminal is a telephone device; and
said first authentication key is a telephone number of said telephone device, which is notified when a call is made from said telephone device.

10. The authentication system of claim 9, further comprising a service provision server, and wherein:
said service provision server comprises:
a first telephone number reception unit which receives said telephone number of said telephone device of said user; and a telephone number transmission unit which transmits said telephone number which has been received to said one-time ID issuance server; and said one-time ID issuance server comprises:
- a second telephone number reception unit which receives said telephone number from said service provision server; and
- a telephone number registration unit which registers said telephone number which has been received in said first authentication key storage unit.

11. The authentication system of claim 7, further comprising a service provision server, and wherein:
said authentication server comprises a return unit which performs predetermined confirmation processing including authentication on the basis of said authentication symbol string which has been received from said authentication symbol string construction server, and returns a confirmation result; and
said service provision server comprises a service supply unit which receives said confirmation result, and starts the supply of said service if said confirmation result shows that the supply of said service is permitted.

12. The authentication system of claim 7, wherein said ID issuance unit notifies said one-time ID by audio.

13. The authentication system of claim 7, wherein:
said first symbol string acquisition unit of said authentication symbol string construction server comprises:
- an issued one-time ID reception unit which sequentially receives the one-time ID issued by said one-time ID issuance server, and the corresponding said first symbol strings;
- an issued one-time ID storage unit which stores said one-time IDs and said first symbol strings which have been received; and
- a first symbol string search unit which searches, from said issued one-time ID storage unit, for a first symbol string corresponding to said one-time ID which has been received from said second terminal.

14. The authentication system of claim 7, wherein:
said first symbol string acquisition unit of said authentication symbol string construction server comprises:
- a one-time ID transmission unit which transmits said one-time ID which has been received to said one-time ID issuance server; and
- a corresponding first symbol string reception unit which receives from said one-time ID issuance server a first symbol string which corresponds to said one-time ID; and said one-time ID issuance server comprises:
- an issued one-time ID storage unit which stores said one-time IDS which have been issued and said first symbol strings which correspond thereto;
- a one-time ID reception unit which receives said one-time ID which has been transmitted from said authentication symbol string construction server;
- a first symbol string search unit which searches, on the basis of said issued one-time ID storage unit, for a first symbol string corresponding to said one-time ID which has been received from said authentication symbol string construction server; and
- a first symbol string transmission unit which transmits said first symbol string which has been found to said authentication symbol string construction server.

15. An authentication method for an authentication system which comprises an authentication server which performs authentication using an authentication symbol string, a one-time ID issuance server, and an authentication symbol string construction server, comprising:
- a first reception step in which one-time ID issuance server receives, from a first terminal of a user, a first symbol string which is a portion of said authentication symbol string;
- a one-time ID issuance step in which said ID issuance unit issues a one-time ID to said first terminal;
- a one-time ID storage step in which said one-time ID issuance server stores said first symbol string and said one-time ID which has been issued in mutual correspondence in a one-time ID storage unit;
- a second reception step in which said authentication symbol string construction server receives, from said second terminal, a second symbol string which is the remaining portion of said authentication symbol string other than said first symbol string, and said one-time ID;
- a first symbol string acquisition step in which said authentication symbol string construction server acquires said first symbol string which corresponds to said one-time ID which has been received;
- a construction step in which said authentication symbol string construction server reconstructs said authentication symbol string on the basis of said first symbol string which has been acquired and second symbol string which has been received from said second terminal;
- an authentication symbol string transmission step in which said authentication symbol string construction server transmits said authentication symbol string which has been reconstructed to said authentication server;
- an authentication step in which said authentication server performs confirmation processing which includes authentication on the basis of said authentication symbol string; and
- a confirmation result transmission step in which said authentication server transmits results of said confirmation processing.

16. The authentication method of claim 15, wherein:
said one-time ID issuance server comprises a first authentication key storage unit which stores a first authentication key of the user, and a management ID of said user;
said authentication symbol string construction server comprises a second authentication key storage unit which stores a second authentication key of the user, and the management ID of said user;
in said first reception step, said first authentication key and said first symbol string are acquired from said first terminal of said user;
in said one-time ID issuance step, a first stage of authentication is performed by comparing said first authentication key which has been received, with said first authentication key which is stored in said authentication key storage unit, and said one-time ID is issued if said authentication has succeeded;
in said one-time ID storage step, said one-time ID, said first symbol string, and said management ID of the user for which authentication has succeeded, are stored in mutual correspondence;
in said second reception step, said second authentication key of said user and said second authentication symbol string are received from said second terminal;
in said second symbol string transmission step, said second authentication key and said second authentication symbol string are transmitted to said authentication symbol string construction server;
and further comprising;
- a management ID acquisition step in which said authentication symbol string construction server acquires from said second authentication key storage unit the management ID which corresponds to said second authentication key which was received in said second reception step; and wherein, in said first symbol string acquisition step, said first symbol string is acquired on the basis of said management ID which has been acquired and said one-time ID which has been received.

17. The authentication method of claim 16, wherein said first terminal is a telephone device, and said first authentication key is a telephone number of said telephone device, and further comprising:

a first telephone number reception step in which a service provision server of said authentication system receives said telephone number of said telephone device of said user; and a telephone number transmission step in said telephone number which has been received, is transmitted to said one-time ID issuance server;

a second telephone number reception step in which said one-time ID issuance server receives said telephone number from said service provision server; and a telephone number registration step in which said telephone number which has been received, is registered in said first authentication key storage unit.

* * * * *